(12) United States Patent
　　　Shirasaki

(10) Patent No.: US 8,708,507 B2
(45) Date of Patent: Apr. 29, 2014

(54) OPTICAL APPARATUS FOR MAGNIFYING A VIEW OF AN OBJECT AT A DISTANCE

(76) Inventor: Masataka Shirasaki, Winchester, MA (US)

( * ) Notice: Subject to any disclaimer, the term of this patent is extended or adjusted under 35 U.S.C. 154(b) by 585 days.

(21) Appl. No.: 12/928,647

(22) Filed: Dec. 16, 2010

(65) Prior Publication Data

US 2011/0216421 A1　Sep. 8, 2011

Related U.S. Application Data

(63) Continuation-in-part of application No. 12/798,358, filed on Apr. 2, 2010, now abandoned.

(60) Provisional application No. 61/339,305, filed on Mar. 3, 2010, provisional application No. 61/343,936, filed on May 6, 2010, provisional application No. 61/403,075, filed on Sep. 10, 2010.

(51) Int. Cl.
　　*G02B 5/08*　　(2006.01)
　　*G02B 5/10*　　(2006.01)

(52) U.S. Cl.
　　USPC ............................ 359/850; 359/859; 359/869

(58) Field of Classification Search
　　USPC ........................................................ 359/859
　　See application file for complete search history.

(56) References Cited

U.S. PATENT DOCUMENTS

| | | | |
|---|---|---|---|
| 3,814,504 A | 6/1974 | Brady | |
| 5,270,859 A | 12/1993 | Wirth et al. | |
| 5,841,596 A | 11/1998 | Perlo | |
| 2009/0128899 A1 | 5/2009 | Newell | |

FOREIGN PATENT DOCUMENTS

| | | |
|---|---|---|
| EP | 1715260 A2 | 10/2006 |
| WO | WO2008/140106 A1 | 11/2008 |

*Primary Examiner* — Jade R Chwasz

(57) ABSTRACT

The magnifying apparatus is based on two dimensional arrays of micro magnifying modules (MMMs) positioned along a plane perpendicular to the axis of the magnifying apparatus. In addition, the structure may include a two dimensional array of micro beam multipliers (MBMs) to improve the quality of the magnified image. The micro beam multipliers are positioned along a plane parallel to the array of micro magnifying modules. The structure also may include a two dimensional array of ray angle adjusters (RAAs) to extend the view angle. The ray angle adjusters are positioned along a plane parallel to the array of micro magnifying modules. The array of micro magnifying modules, with or without the micro beam multipliers and/or ray angle adjusters, may be constructed as a thin plate with a thickness of a few millimeters, through which the object is viewed. An object at a distance appears in the magnifying apparatus as a magnified image and the magnifying apparatus can be used for viewing an object at a distance in a way similar to the use of a conventional magnifier for viewing an object in a short distance.

20 Claims, 46 Drawing Sheets

Side view of MMM

Front view from inside of MMM

With center absorbing area added

On axis beam

Off axis beam

Without beam multiplier plate

Center      291      Center

291

With beam multiplier plate

View from front     Side view at center     View from back

Watching TV

Reading documents

Actual light paths

One directional layout

Concentric circles
(Front view)

One of cut rings
(Perspective view)

Without lens effect

With lens effect (convex lens) on object side of MMM

Without lens effect

With lens effect (convex lens) on opposite side of MMM to object

OPTICAL APPARATUS FOR MAGNIFYING A VIEW OF AN OBJECT AT A DISTANCE

RELATED APPLICATIONS

This application is a continuation-in-part application of application Ser. No. 12/798,358, filed Apr. 2, 2010 now abandoned.

This application claims the benefit of provisional Application No. 61/339,305, filed Mar. 3, 2010, which application is incorporated herein by reference.

This application also claims the benefit of provisional Application No. 61/343,936, filed May 6, 2010, which application is incorporated herein by reference.

This application also claims the benefit of provisional Application No. 61/403,075, filed Sep. 10, 2010, which application is incorporated herein by reference.

BACKGROUND OF THE INVENTION

The present invention relates to optical magnifying devices for magnifying a view of an object at a distance.

To magnify a view of an object or scene at a distance, the most common apparatus is a telescope. A well known telescope design is a Galileo telescope, which consists of a convex lens and a concave lens. The fundamental function of a telescope is to enlarge the angle of a light ray coming from the object at a distance. In a conventional telescope, a ray with an angle $\theta_1$ coming from an object whose distance is virtually at infinity is converted through the telescope into a ray with a larger angle $\theta_2$, where both angles are defined as angles with respect to the axis of the telescope. The eye sees the ray with angle $\theta_2$, and therefore, sees the object in the direction at angle $\theta_2$. Assuming $\theta_2$ is in proportion to $\theta_1$, the image of the object is magnified and the magnification is given by the ratio $\theta_2/\theta_1$.

More generally, any optical apparatus which converts the ray angle from $\theta_1$ to $\theta_2$ will magnify the view of the object at a distance. All such apparatus also converts the diameter of a collimated light beam from $D_1$ to $D_2$, where $D_2$ is smaller than $D_1$, and the magnification is given by the ratio $D_1/D_2$.

In a conventional telescope, the diameter of the collimated light beam emerging from the telescope determines the view area. Since the collimated light beam is compressed in diameter through the telescope, the view area is only a portion of the cross section of the telescope. To provide a sufficient view area, the diameter of the view area is usually 10 mm or larger. Therefore, conventional telescopes are at least a few centimeters long and cannot be built in a shape of a thin plate.

If the eye is distant from a telescope compared to the size of the view area of the telescope, the eye can view the image only within a small view angle. To view the image outside the view angle, an additional telescope may be placed beside the original telescope. Then the additional telescope provides the view in that direction. This concept may be extended to multiple telescopes, where each additional telescope provides the view in its direction. Several designs using multiple Galileo telescopes are disclosed in U.S. Pat. No. 5,270,859 and US patent application 20090128899. Combined with the multiple telescopes, the total range of the view area may be expanded, but the actual view is limited to the combined view areas of individual telescopes.

In the designs in the prior art using multiple Galileo telescopes, the dimension parallel to the light rays is several times greater than the telescope diameter. An important drawback in these devices is the aberration of the lens. In a conventional single Galileo telescope, the eye pupil is located within only a portion of the output light beam (given here as diameter $D_2$). Actually, the size of eye pupil is much smaller than the beam size $D_2$. Therefore, only a small portion of light in the beam diameter $D_2$ is received by the eye. That is, a point on an object is viewed through only a small portion of each lens of the telescope and the image does not suffer much from the lens aberration. A different point on the object is viewed through a different portion of each lens. Since different points are viewed through different portions of each lens, the image could be distorted due to the lens aberration. However, the sharpness of the image is not equivalently degraded. In contrast to the conventional single Galileo telescope, the lens aberration in the multiple Galileo telescope directly affects the sharpness of the images, unless the beam diameter $D_2$ is much larger than the eye pupil size. This is because all rays passing through the entire area of each lens produce a point in the image.

To reduce the length of the telescopes without sacrificing lens aberration, each telescope may be made with a small diameter, and then small $D_1$. Then $D_2$ will be further small. However, if the area of diameter $D_2$, from which the light beam is emitted, is too small, the beam diverging effect due to diffraction impairs the sharpness of the image. Thus, reducing the telescope length is limited, and therefore, the multiple telescope designs of the prior art cannot be practically built on a scale of a thin plate.

BRIEF SUMMARY OF THE INVENTION

Conventional telescopes do not provide a large view area and a short telescope length at the same time. To overcome this, a new structure of a magnifying apparatus is proposed. This structure is based on a two dimensional array of micro magnifiers positioned along or near a plane nearly perpendicular to the axis of the magnifying apparatus. This array of micro magnifiers is defined as a magnifier plate and the micro magnifiers are referred to herein as Micro Magnifying Modules (MMMs).

In addition, the structure of the present invention may include a two dimensional array of micro beam multipliers to improve the quality of the image. The micro beam multipliers are positioned along or near a plane nearly parallel to the magnifier plate. This array of micro beam multipliers is defined as a beam multiplier plate and the micro beam multipliers are referred to herein as Micro Beam Multipliers (MBMs).

The structure of the present invention may include a two dimensional array of ray angle adjusters to offset the ray angle in the MMM and reduce aberrations of the MMM, when the input ray angle to the magnifying apparatus is not small with respect to the axis of the magnifying apparatus. The ray angle adjusters are positioned along or near a plane nearly parallel to the magnifier plate. This array of ray angle adjusters is defined as an angle adjuster plate and the ray angle adjusters are referred to herein as Ray Angle Adjusters (RAAs).

The magnifier plate with or without the beam multiplier plate and/or the angle adjuster plate may be constructed as a thin plate with a thickness of a few millimeters, through which the object is viewed. Therefore, with the magnifying apparatus of the present invention, an object at a distance appears in the magnifying apparatus as a magnified image. The magnifying apparatus can be used for viewing an object at a distance in a way similar to the use of a conventional magnifier for viewing an object in a short distance. Applications of the present invention include an attachment to eyeglasses or eyeglass lens itself. This application of the magnifying apparatus provides a hands free magnifier in a shape of eyeglasses.

Eyeglasses with the magnifying apparatus of the present invention could be a powerful tool for recovering eyesight of people with impaired vision. Unlike conventional magnifiers and binoculars, the magnifying apparatus of the present invention provides a light weight hands free magnifier. This helps people with poor eyesight watch TV at a distance. The magnifying apparatus of the present invention can also be used to read documents. This is a useful tool for people who use reading glasses but eyesight is not sufficient to read documents without a magnifying lens.

DETAILED DESCRIPTION OF THE INVENTION

Figure 1:
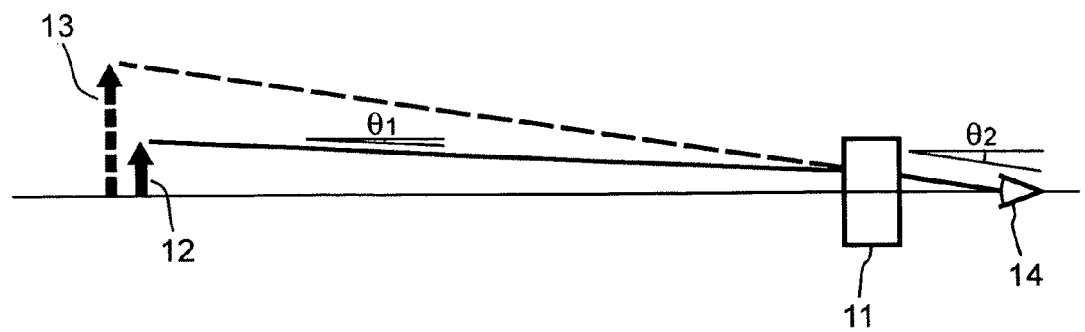
FIG. 1 is a light ray diagram illustrating a remote object viewed through a magnifying device.

A magnifying apparatus such as a telescope works as shown in FIG. 1. A ray with a traveling angle $\theta_1$ coming from an object 12 whose distance is virtually at infinity is converted through a magnifying apparatus 11 such as a telescope into a ray with a larger traveling angle $\theta_2$, where both traveling angles are defined as angles with respect to the axis of the magnifying apparatus. The eye 14 sees the ray with angle $\theta_2$, and therefore, sees the image 13 of the object in the direction at angle $\theta_2$. Assuming $\theta_2$ is in proportion to $\theta_1$, the image of the object is magnified and the magnification is given by the ratio $\theta_2/\theta_1$.

A well known design of Galileo telescope consists of a convex lens and a concave lens, and has the function of enhancing of the traveling angle described in FIG. 1. If a Galileo telescope is designed to make a view area to be, for example, a centimeter in diameter, the total length of the telescope will be several times longer than the diameter, that is, several centimeters. Short focal length lenses may be used to reduce the telescope length, but short focal length lenses result in increased lens aberrations.

Figure 2:
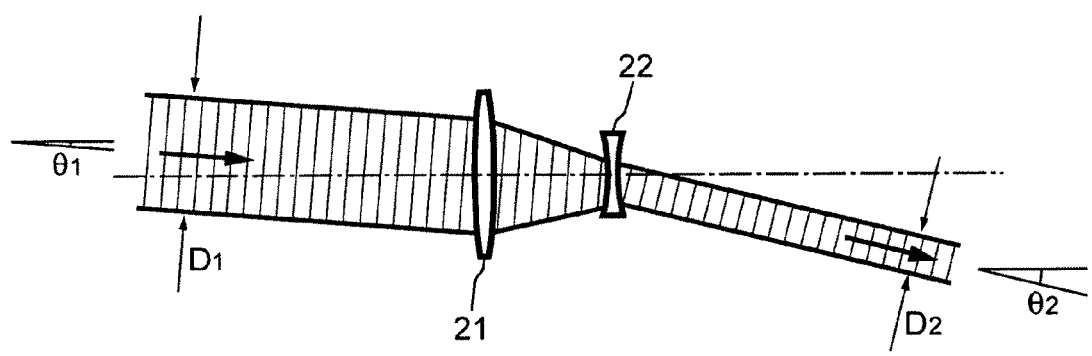
FIG. 2 is a schematic representation of a Galileo telescope.
Figure 3:
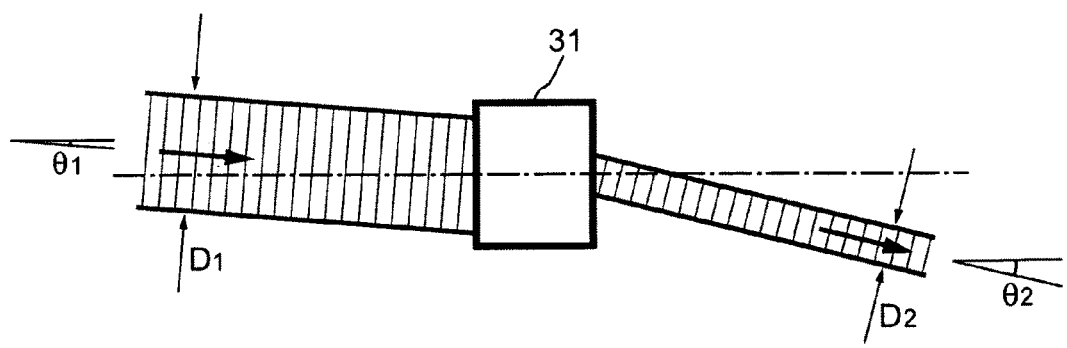
FIG. 3 is a schematic representation of a generalized magnifying device.

FIG. 2 illustrates a Galileo telescope, converting an input ray having traveling angle $\theta_1$ to an output ray with traveling angle $\theta_2$. It also converts input collimated light beam with diameter $D_1$ into an output collimated light beam with a smaller diameter $D_2$. In the design of FIG. 2, the input collimated light beam is converged by the convex lens 21 toward its converging point, but the converging effect is canceled before reaching the converging point by the concave lens 22. The converging point is on the focal plane of the convex lens. Typically the convex and concave lenses have focal points at the same position. This structure has a function of a beam expander for light traveling in a backward direction and a beam compressor for light traveling in a forward direction. More generally, as shown in FIG. 3, an optical apparatus 31 which converts the diameter of a collimated light beam from $D_1$ to $D_2$ works as a telescope. In this optical apparatus, the magnification is given by the ratio $D_1/D_2$ as is explained below.

From the above results, it is expected that both $\theta_2/\theta_1$ and $D_1/D_2$ give the magnification, and therefore, they are the same number. The relation $\theta_2/\theta_1=D_1/D_2$ is briefly understood as described below using rectangular beam profiles in a one dimensional model. As a convenient model, two collimated light beams with equal diameter $D_{in}$ and with a small difference $D_{in}$ between their traveling angles are considered as the input light to the telescope. These collimated light beams overlap when traveling through the telescope. Assuming the beam profiles are rectangular, they are in optically orthogonal modes if the optical phase difference between the phases of the two entering light beams changes $2\pi$ across the beam diameter $D_{in}$ at the telescope. The beam orthogonality is maintained throughout the telescope to ensure energy conservation. Therefore, the two collimated light beams emerging from the telescope have a difference $\theta_{out}$ between their traveling angles, where the optical phase difference between the phases of the two emerging light beams also changes $2\pi$ across the beam diameter $D_{out}$. The phase change $2\pi$ is equivalent to a distance of the wavelength $\lambda$ in space. With these relations, $D_{in}\theta_{in}=D_{out}\theta_{out}=\lambda$, and thus, $D_{in}/D_{out}=\theta_{out}/\theta_{in}$ is obtained. Assuming that $D_{in}=D_1$, $D_{out}=D_2$, and $\theta_{out}/\theta_{in}=\theta_2/\theta_1$, $\theta_2/\theta_1=D_1/D_2$ is obtained.

In many conventional telescope designs, chromatic aberration is an important design issue. Chromatic aberration results from chromatic dispersion due to the refractive index of the lens material and cannot be eliminated using a single lens. Geometrical aberrations may be reduced by using an aspherical lens, but this improvement is limited, especially when the length of the telescope is made short. The relevance of this design issue in the context of the present invention will become evident.

The present invention provides a design of a magnifying apparatus to overcome the problem of the apparatus dimensions while a practical view area is maintained. The magnifying apparatus in the present invention consists, in principle, of an array of MMMs in two dimensions. An individual MMM is a small cell, which has the same function as a telescope. That is, an input collimated light beam to a MMM is converted into an output collimated light beam with a smaller diameter, and the light traveling angle is enhanced from $\theta_1$ to $\theta_2$ as shown in FIG. 3. The period of MMMs in the array is determined so that the gap between the adjacent light beams traveling to the eye be smaller than the size of eye pupils in both directions of the two dimensions. This array of MMMs is defined as the magnifier plate.

Figure 4:
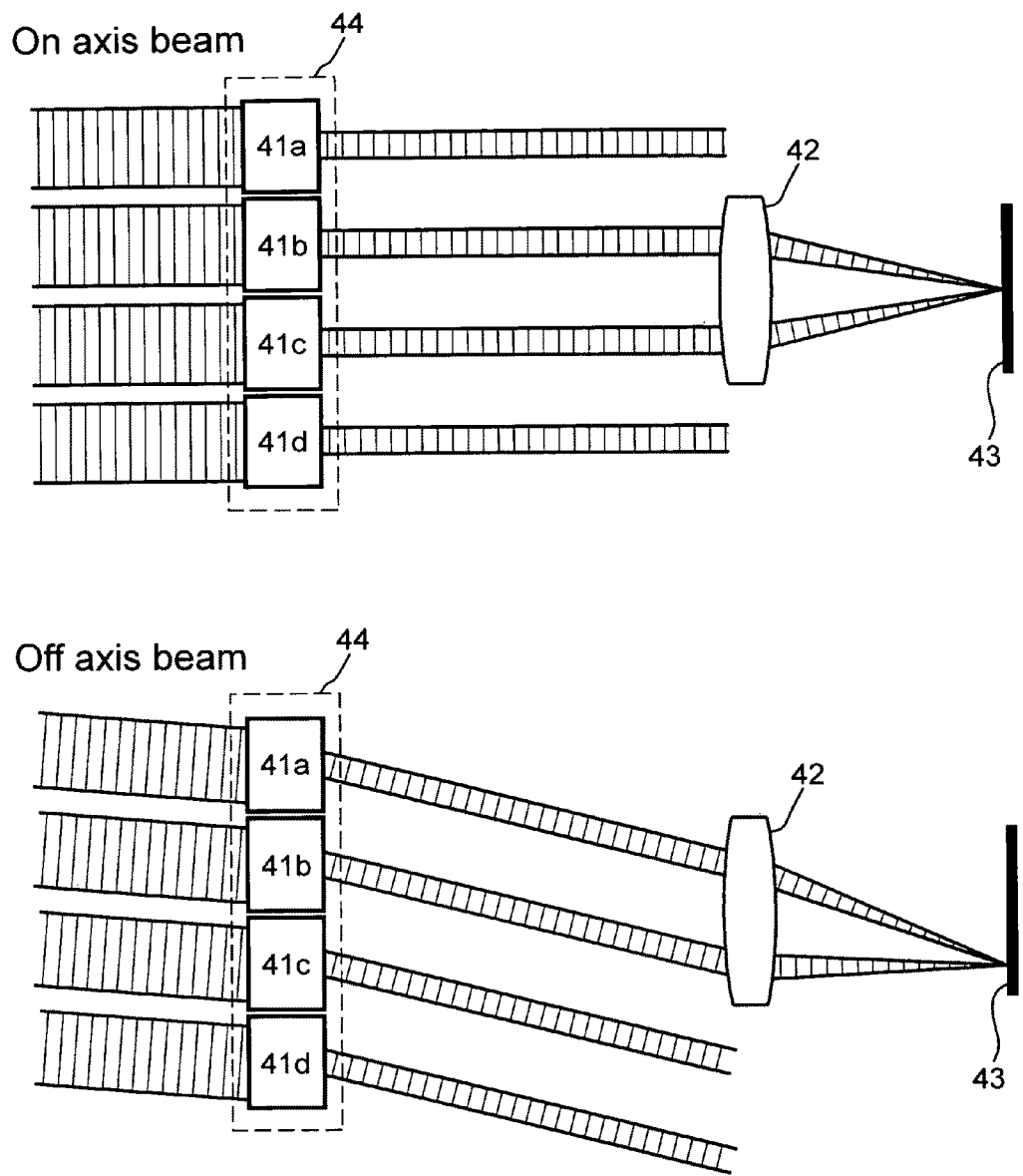
FIG. 4 shows a diagram of a magnifier plate with an array of four MMMs, one for on-axis light beam from the far field image to the eye and one for off-axis light beam.

FIG. 4 illustrates the light beams in one dimensional view from the side of the magnifier plate. The magnifier plate produces many light beams emitted from an array of MMMs, 41a, 41b, 41c, and 41d, arrayed on the surface of the magnifier plate 44. The view area of the magnifying apparatus is determined virtually by the size of the magnifier plate. FIG. 4 (top) shows the light beams entering the magnifier plate in parallel to the axis of MMMs. The light beams exiting from the MMMs are parallel to the axis. However, there exist gaps between adjacent light beams when observed in the plane perpendicular to the light traveling direction. FIG. 4 (bottom) shows the light beams entering the magnifier plate at an angle with respect to the axis. The light beams exiting from the MMMs are parallel to each other, but they travel at a magnified angle with respect to the axis. In this case, too, there exist gaps between adjacent light beams when observed in the plane perpendicular to the light traveling direction. The output light beams travel to the crystalline lens 42 of the eye and focus onto a point on the retina 43. If the eye pupil falls into one of the gaps, no light enters the eye and the eye cannot see the object. Therefore, it is important that the gap between the light beams traveling toward the eye be made smaller than the size of the eye pupil. The gap can be made small by either making the transversal dimension of the MMM small, or employing a component to multiply light beams. The latter is the subject of an embodiment of the present invention described below. When the size of the gaps is well below the size of eye pupils, the eye does not recognize the gaps, and sees the magnified image of the object without interruption by the gaps.

Figure 5:
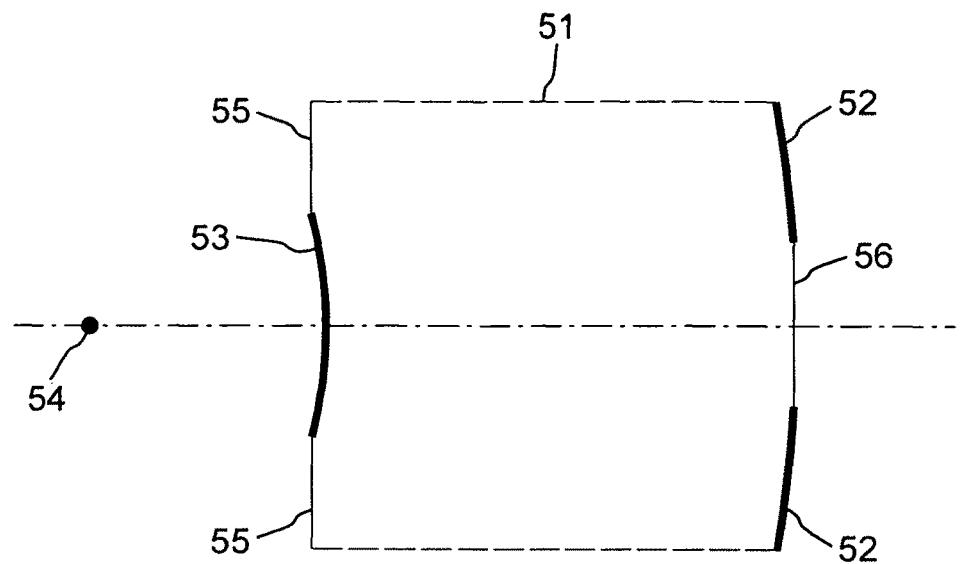
FIG. 5 shows the MMM that is a main aspect of the invention.

The MMMs are basic building blocks of the apparatus of the present invention, and will be described in detail in conjunction with FIGS. 5 and 6. The MMM comprises a body 51 of transparent material, typically glass or a rigid polymer. The magnifying apparatus will typically be used for viewing images in the visible spectrum, and the body 51 should have a high transparency, preferably greater than 95%, to at least one wavelength or wavelength band in the visible spectrum. In some applications, other wavelengths may be of interest, for example, infra red, and will require corresponding high transparency in the wavelength band of interest. For example, for an infra-red telescope the body 51 may be silicon.

The MMM comprises concave mirror 52 and convex mirror 53. The concave mirror has a hole 56 at the center. In a typical design, the concave mirror and the convex mirror have the focal points at the same position 54 or at positions that are not distant from each other. The bold curves are the mirrors and the space between the mirrors is filled with transparent material as just described. Since the MMM uses internal reflections in medium 51, chromatic aberration is not an issue. The flat surface 55 on the left side of the MMM, surrounding the convex mirror, is the light entrance window. The flat surface 56 on the right side of the MMM, within the hole at the center of the concave mirror, is the light exit window. The entrance window and the exit window are shown by a thin line in FIG. 5 and are preferably anti-reflection coated or index matched with the external medium. Although the light exit window illustrated in FIG. 5 is a flat surface, it does not have to be flat, if the refractive indices of inside and outside of the light exit window are matched. Furthermore, the surface may be part of the concave mirror shape against the air and the effect of the curved surface may be adjusted separately. Also, to avoid undesirable reflections of light, the outside (right side) surfaces of the concave mirror facing the eye are preferably black in color or are light absorptive surfaces.

The structure of each single MMM looks similar to the Cassegrain reflector to the extent that the concave mirror has a hole at the center. In the present invention, the MMM functions as a beam expander/compressor of collimated light beams, and therefore, both convex and concave mirrors are preferably exactly or nearly parabolic.

A useful feature of the MMM design is that a light beam through the MMM undergoes internal reflections without encountering a refractive interface. When the input light beam and the output light beam are nearly normal to the entrance window and the exit window, respectively, the beam undergoes little refraction throughout the MMM. Thus the MMM magnifies the ray angle with little chromatic aberration.

The two dimensional array of the MMM bodies 51 will typically be a flat plate, with mirror elements 52 and 53 formed in or on body 51. In FIG. 5, the mirrors are shown as depressions in body 51. The mirrors may also be formed as attachments to the surface of body 51. The construction may vary depending on the manufacturing technology used.

In typical embodiments, the MMMs are positioned periodically in two dimensions. However, any array geometry, including both periodic and arbitrarily spaced arrays, may be used. Each MMM is small in the longitudinal direction, but not too small in the transversal directions to suppress the light diffraction. With this design, the magnifier plate may be made thin, e.g., in the range 1-8 mm, and emits well collimated light beams with enhanced traveling angles.

Figure 6:
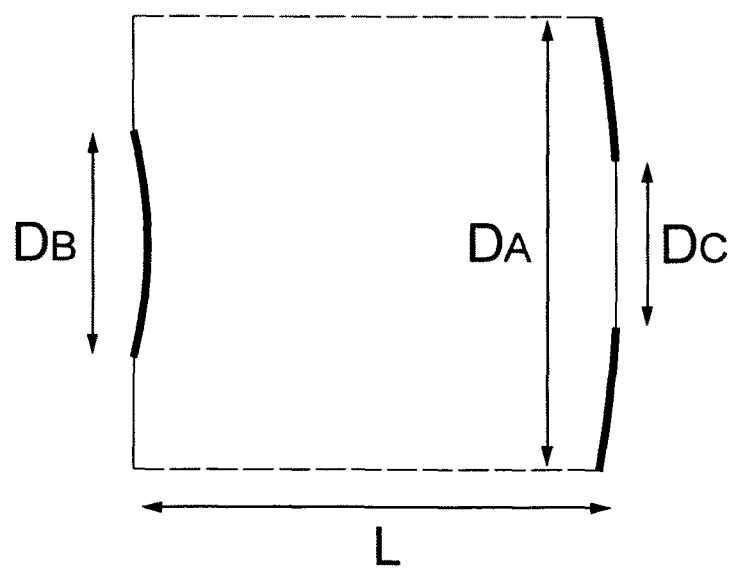
FIG. 6 shows the relevant design parameters for the MMM of FIG. 5.

The design parameters of a MMM are shown in FIG. 6. The MMM shown in this embodiment is the fundamental case where the mirrors are circular when viewed from the direction of light. Other cases will be considered later. In FIG. 6, dimension "$D_A$" is the diameter of the concave mirror, dimension "$D_B$" is the diameter of the convex mirror, dimension "$D_C$" is the diameter of the exit window, dimension "L" is the distance between the center positions of the concave parabola and the convex parabola. Parameters not illustrated are the focal length $f_1$ of the concave mirror, the focal length $f_2$ of the convex mirror, and the refractive index "n" of the MMM material.

In an illustrative embodiment, $D_A$=1.8 mm, $D_B$=0.9 mm, $D_C$=0.66 mm, L=1.8 mm, $f_1$=2.7 mm, $f_2$=0.9 mm, and n=1.5. With these parameters, the magnification of the MMM is $f_1/f_2$=3. These parameters may vary for different magnifications or by other factors.

Considering the function of the magnifier plate as a whole, an input collimated light beam to the magnifier plate is converted into a large number of output collimated light beams, each with reduced diameter and enhanced traveling angle. As a result, the output light beams have gaps between adjacent beams. The size of a gap between beams entering the eye is preferably well below the size of eye pupils. A recommendation for this design parameter is that the gap be less than 2 mm, and preferably less than 1 mm. This helps the gaps become invisible when the eye is focused at a far distance.

Figure 7:
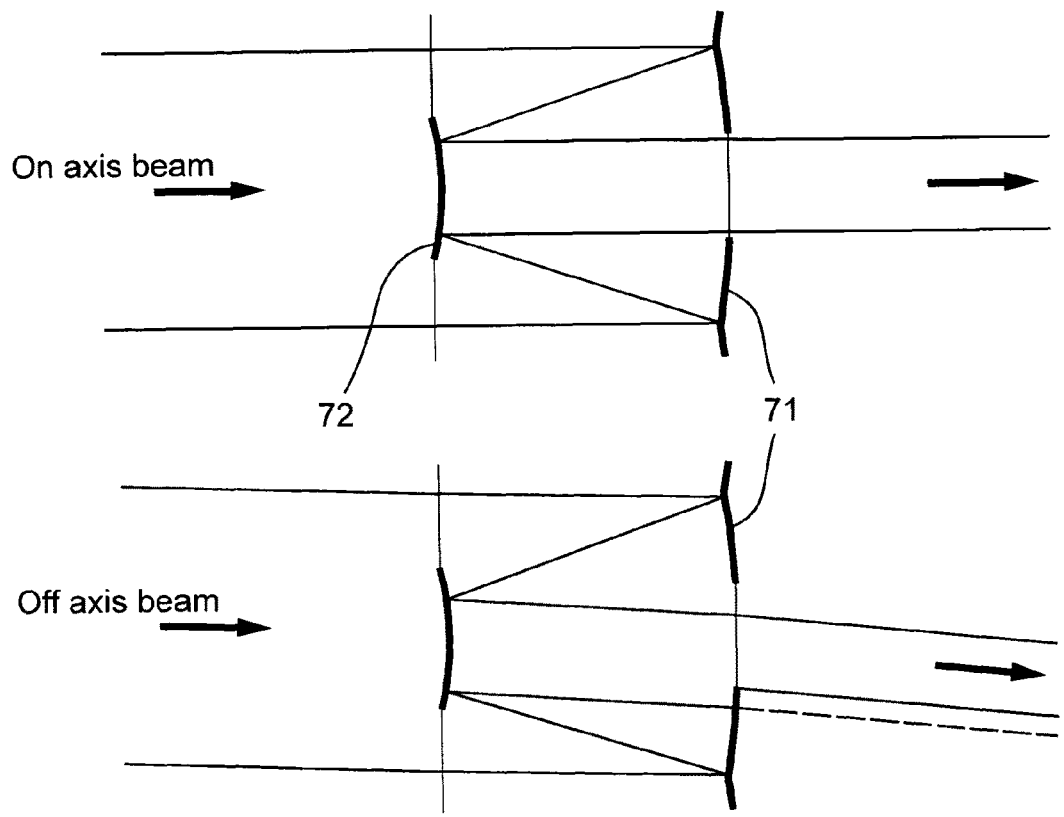
FIG. 7 illustrates the light beam path for an on-axis beam and an off-axis beam through the MMM.

The paths of light beams traveling through the MMM are shown in FIG. 7 for both cases of on-axis input beam and off-axis input beam. The collimated light beam entering the MMM from the left through the light entrance window is reflected back by the concave mirror 71 and the light rays are traveling toward a point on the focal plane of the concave mirror. Before they reach the focal plane, the rays are reflected by the convex mirror 72 and they form a collimated light beam traveling to the right. This is because the concave mirror and the convex mirror have the focal points at the same position or at positions that are not distant from each other. The collimated light beam after reflection by the convex mirror exits the MMM through the light exit window, which is the hole at the center of the concave mirror. As is apparent, the diameter of the output beam is smaller than the input beam diameter.

Figure 8:
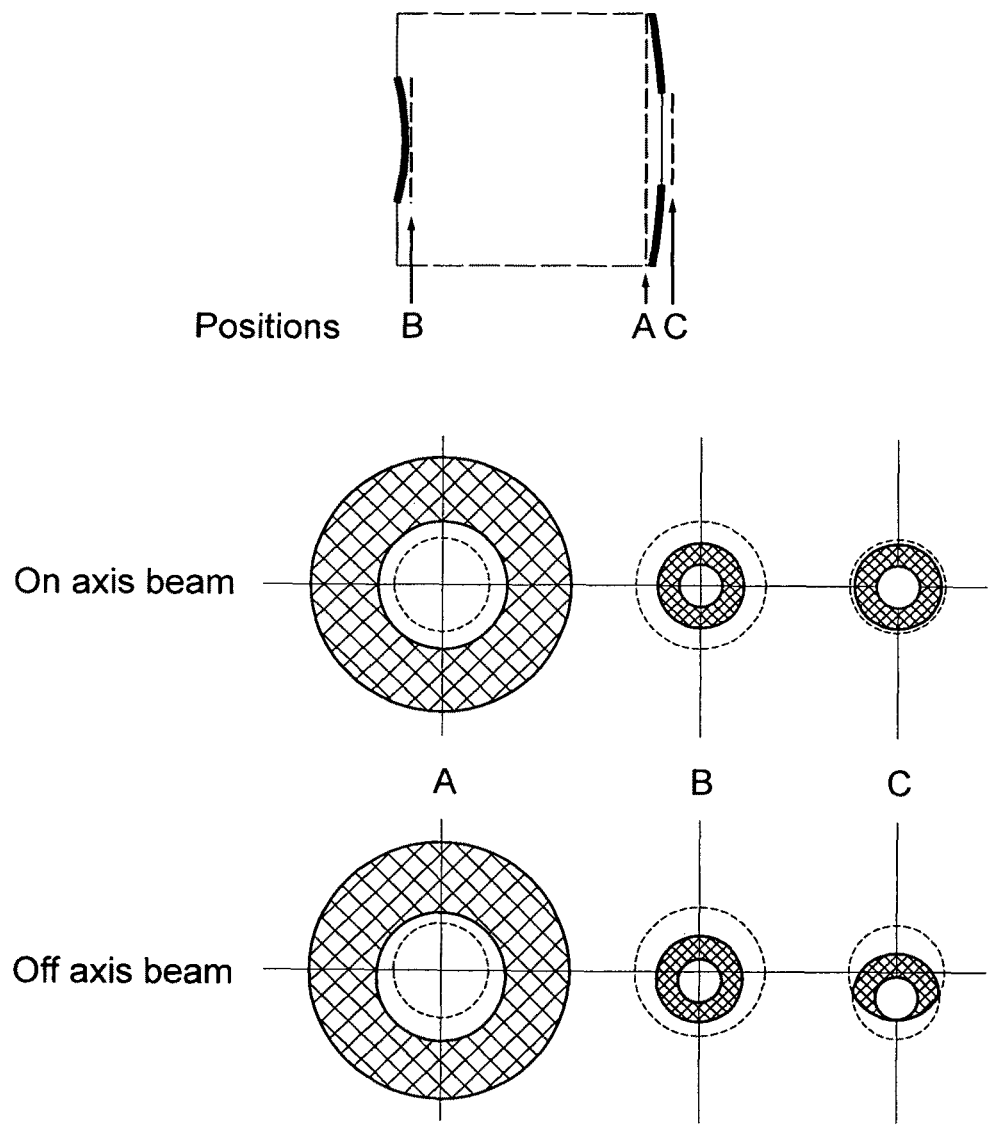
FIG. 8 illustrates the light wave front in the MMM at the positions shown.

The cross section of a light beam and its center will change along the beam path in the MMM. The beam profile and its center at three different positions A, B, and C, along the light path in the MMM are illustrated in FIG. 8. Position A is just before the light reaches the concave mirror, position B is just before the light reaches the convex mirror, and position C is at the light exit window, which is the center portion of the concave mirror. First, when the input light beam is on-axis, the beam profile at A has a diameter of 1.8 mm, where the center portion with a diameter of 0.9 mm is blocked by the convex mirror. The beam profile at B is simply compressed from that at A into the ⅓ size. The beam profile at C is the same as that at B. When the input light beam is off-axis, the beam profile at A has the same diameter of 1.8 mm as the previous case, but the area, which is blocked by the convex mirror, is off center. The beam profile at B is compressed from that at A into the ⅓ size. In addition, the entire beam is also moved off center. The beam profile at C is further moved off center and a portion of the beam is out of the light exit window. Therefore, a portion of the beam is blocked by the concave mirror as shown in FIG. 8.

Although a pair of the mirrors has no chromatic aberration, the light is refracted through the entrance window and the exit window as was shown in FIG. 7. As mentioned above, if the windows are parallel to the magnifier plate, the light passes through the windows in directions nearly normal to the windows, so the refractions at the entrance and the exit windows mostly cancel each other and little chromatic aberration is expected. The numerical simulations show that the change of the output angle due to the index change within the visible wavelengths is much less than $10^{-4}$ radians, and therefore, does not affect the quality of the image in the view.

As was described earlier, the function of the MMM is to convert a collimated input light beam into a collimated output light beam with a smaller diameter. The geometric aberration of the MMM may cause a slight change of the traveling angle of the output rays within the output beam diameter, even if the inpit rays are all parallel. Unlike conventional telescopes, if the parallel rays of input are converted into rays of output, which are not exactly parallel to each other, the sharpness of the image may be impaired. In conventional telescopes, only a portion of rays which are within the eye pupil enters the eye and, as long as the rays within the eye pupil are parallel, the sharpness does not suffer. Rays whose traveling angles change gradually across the light beam will only cause image distortion. On the other hand, in the MMM of the present invention, all or most output rays within the light beam enter the eye. Therefore, in order to create a sharp image, it is important that all output rays are parallel to each other.

To ensure the sharpness of the image, the parallelism of output rays is analyzed, while the input light beam is collimated and the input rays are parallel to each other. The design parameters for this analysis were given earlier with the description of FIG. 6. The MMM for the model used in the analysis is 1.8 mm long and 1.8 mm in diameter, and the refractive index of the material in the MMM is 1.5. The actual shapes of the concave and convex mirrors may be parabolic or non-parabolic. In the analysis, both concave mirror and convex mirror are assumed to be parabolic mirrors with different curvatures. The concave mirror has a focal length of 2.7 mm, with a hole of 0.66 mm in diameter at the center. The convex mirror has a focal length of 0.9 mm and a diameter of 0.9 mm. Since the ratio of the focal lengths is 3, a magnification of 3 is expected with the MMM. The input beam size of 1.8 mm and the magnification of 3 suggest that the output beam size is 0.6 mm. Since the angular diffraction of this collimated output beam due to the beam size of 0.6 mm is not greater than the angular resolution of human eyesight, the quality of the image does not suffer from light diffraction and the analysis can be carried out using ray optics.

In the model for the analysis, as mentioned earlier, both concave and convex mirrors are parabolic mirrors and they share the same focal point. Under this condition, the ray trace shows that all input rays parallel to the axis will exit from the MMM as parallel rays with no aberration. This means that the output ray angle is zero with respect to the axis regardless of the position of the ray across the entrance window. This perfect parallelism is the nature of parabolas and is obtained analytically only when the input light beam is parallel to the axis.

Figure 9:
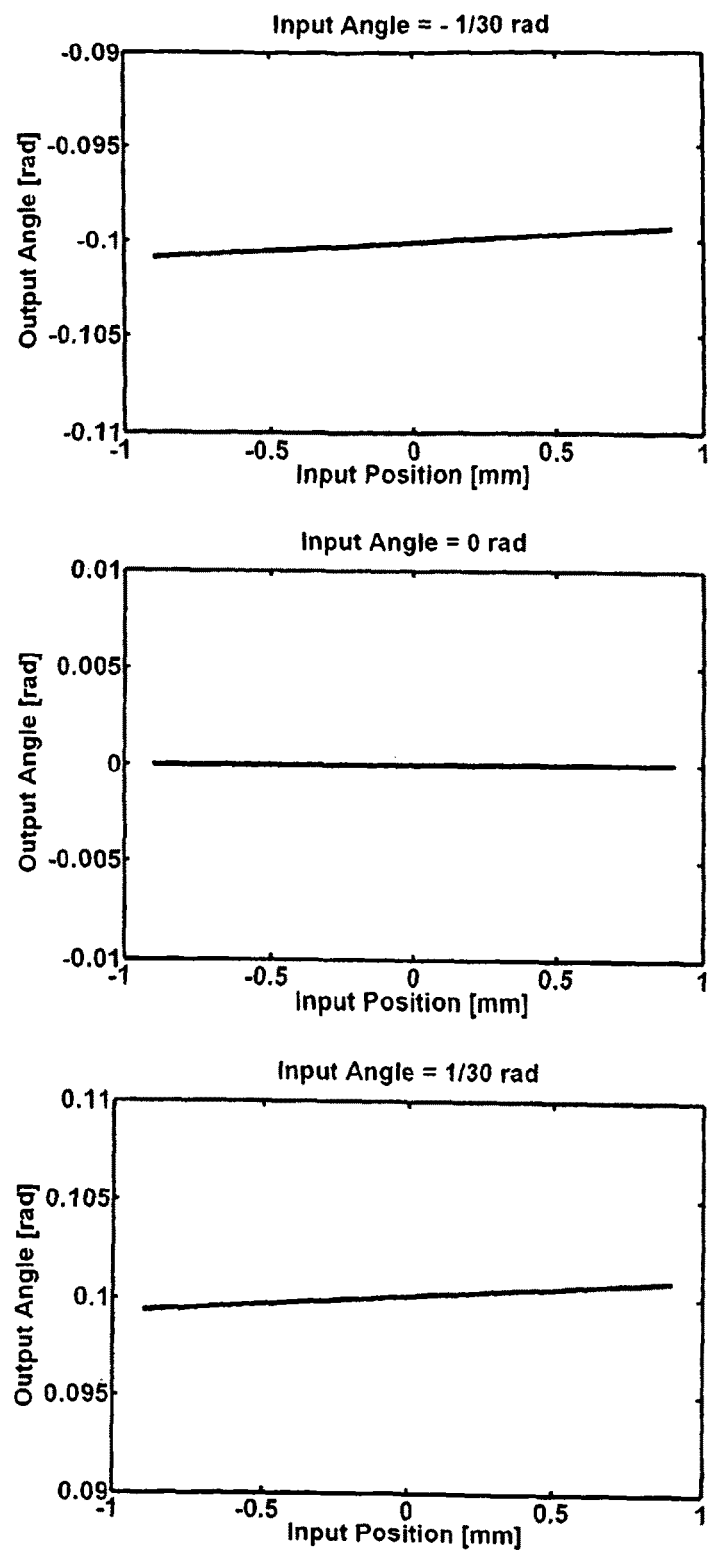
FIG. 9 shows three plots of output ray angle vs. input position for an on-axis beam (center), a slight negative off-axis beam (top), and a slight positive off-axis beam (bottom)

When the input collimated light beam is at an angle with respect to the axis, aberrations may be observed. This means that the output rays are no longer parallel to each other and the output ray angles are not uniform. The design parameters used in the analysis give the magnification of 3, and therefore, the input ray angle of $\frac{1}{30}$ radians should be magnified into the output ray angle of 0.1 radians. The numerical analysis was carried out for three input ray angles, $-\frac{1}{30}$ radians, 0 radians, and $\frac{1}{30}$ radians, and the results are shown in FIG. 9. Each curve indicates the relation between the input ray position across the entrance window of the MMM and the output ray angle with respect to the axis. In the actual MMM, the rays would be blocked by the convex mirror near the center of the entrance window. However, the analysis was carried out as if the rays were not blocked. The analysis indicates that non-uniformity of the output ray angle is within $10^{-3}$ radians when the input ray is angled by $\frac{1}{30}$ radians with respect to the axis. This angle of $\frac{1}{30}$ radians corresponds to output ray angle of 0.1 radians and it provides a practically sufficient view angle. The non-uniformity of less than $10^{-3}$ radians in the entire light beam is small enough to create a sharp image of the object.

Figure 10:
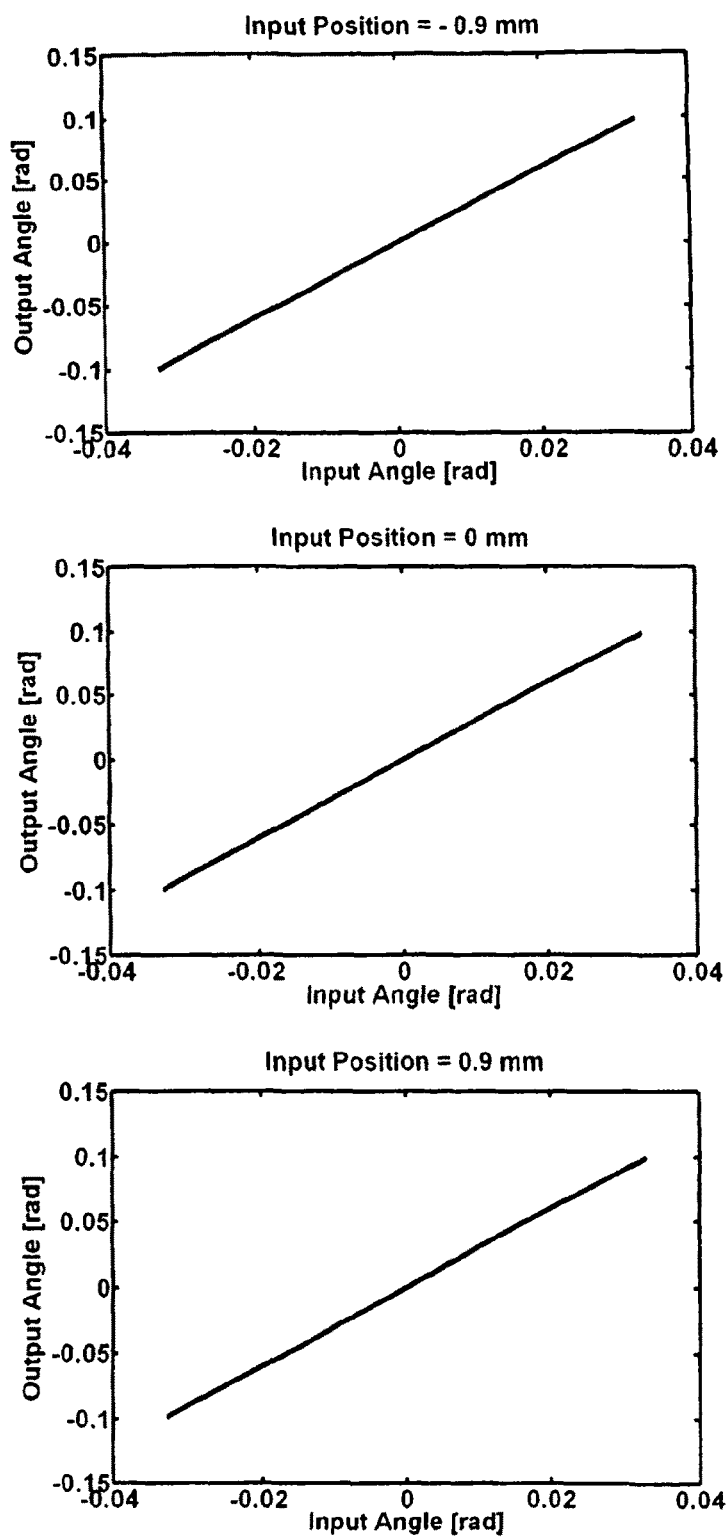
FIG. 10 shows three plots of output ray angle vs. input ray angle for input position at 0 mm (center), input position at −0.9 mm (top), and input position at 0.9 mm (bottom)

The linearity between the input ray angle and the output ray angle is shown in FIG. 10. The curves are calculated at three ray input positions, −0.9 mm, 0 mm, and 0.9 mm, which are one edge, the center, and the other edge of the MMM. In this calculation, too, it was assumed that the rays were not blocked by the convex mirror. The results indicate good linearity with a magnification of 3.

In the analysis above, it is assumed that the distance to the object is virtually infinite and the rays coming from a point on the object are parallel. It is also assumed that the eye is focusing at an object at infinity. In the practical field, these assumptions are not always true. The object may be at a finite distance and/or the eye may be short or long sight, which means that the eye may be focusing at a finite distance. In such cases, the optical designs can be optimized for the conditions. With the optimization, the concave mirror and the convex mirror may no longer share the focal point. To focus an object at a finite distance, the focal point of the concave mirror should be moved in the direction opposite to the object. To focus for short sight eye, the focal point of the convex mirror should be moved in the direction toward the eye. To move the position of the focal point, either physical position or geometrical curve of the mirror may be changed.

Figure 11:
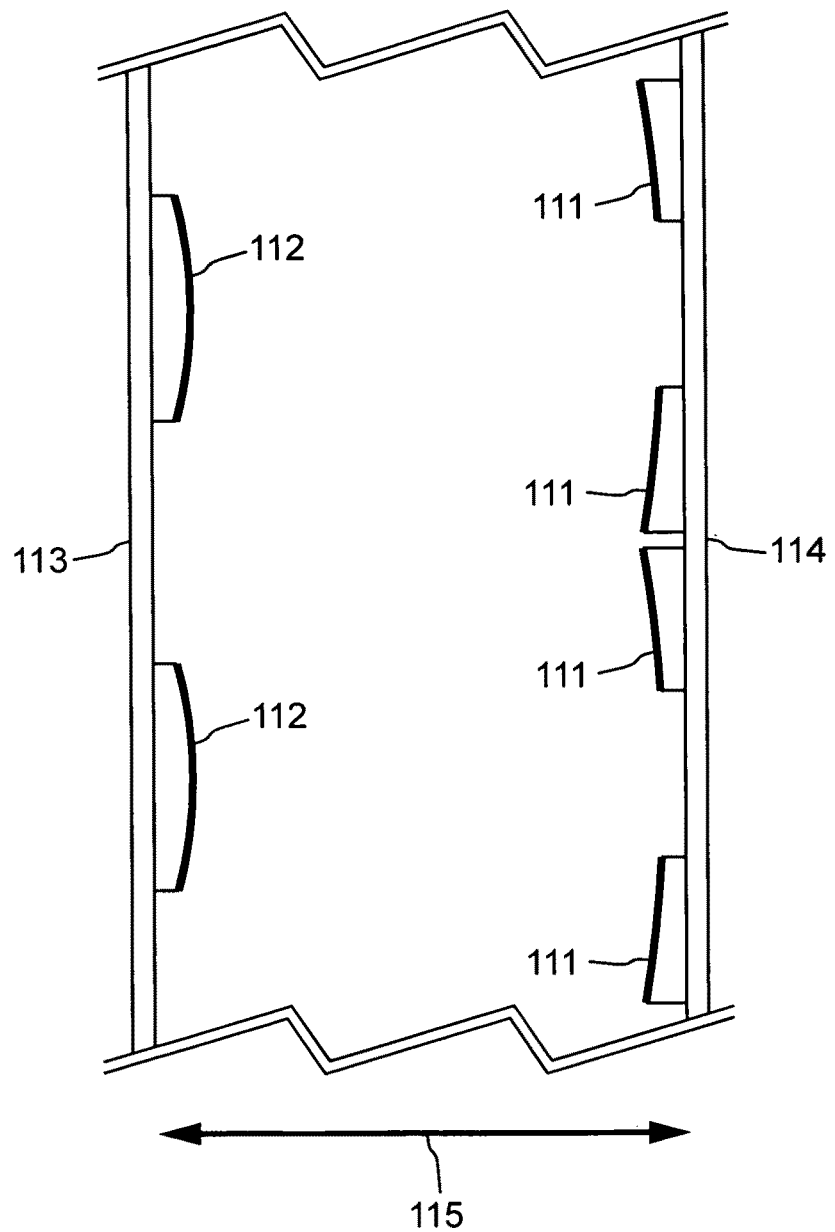
FIG. 11 is a schematic representation of a magnifier plate using spaced apart plates to allow focal point and other adjustments.

An embodiment of a magnifier plate that is easily adjustable to achieve the objective just described is shown in FIG. 11. Here, the magnifier plate comprises, instead of a single plate, two thin plates 113 and 114 spaced apart as shown. The concave mirrors 111 are affixed to the plate 114, or molded as part of the plates. The convex mirrors 112 are affixed to the plate 113, or molded as part of the plates. Two MMMs are shown as part of a larger plate as indicated by the cutaway lines. The spacing, 115, between the plates, and thus the spacing between the mirrors, is adjustable as indicated. This allows the focal points of the mirrors to be coincident or off-coincidence as required. The adjustment may be made by a suitable mechanical screw assembly or the like. Alternatively, since the adjustment is very small, it may be made electrically, using piezoelectric plates or functionally similar elements. This embodiment may have advantages, in addition to adjustability, in ease of fabrication. On the other hand, it adds additional refractive interfaces. Suitable anti-reflection measures are recommended.

The numerical analysis described above was carried out in one dimension. Similar parallelism of the output light rays is expected in a two dimensional analysis. In addition, both concave mirror and convex mirror were assumed to be parabolic mirrors. Modifications of the mirror shapes into non-parabolic mirrors may help further improve the parallelism of the output light rays in off-axis beams.

The simplest form of magnifier plate is a two dimensional array of round MMMs built along a plane in the manner described above. The mirrors in the simple MMM are also round. However, it will be evident to those skilled in the art that an array of circular elements leaves significant void space between them. In an imaging device, this void space is especially undesirable. Thus the simple geometrical array may be modified to produce improved results.

Figure 12:
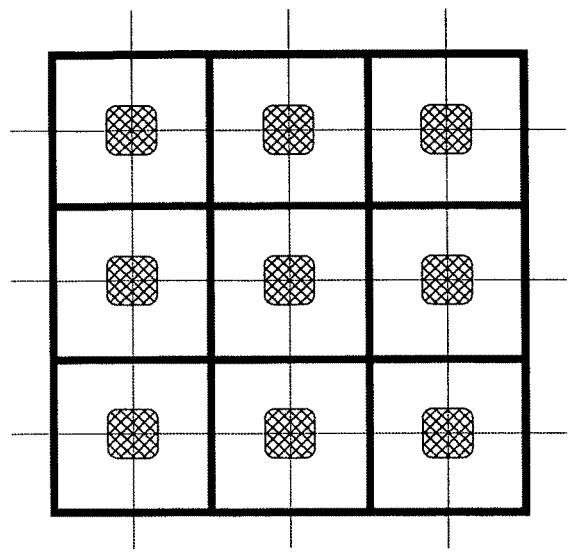
FIG. 12 illustrates one embodiment of a magnifier plate, comprising a two dimensional array of square unit cells, where the individual MMMs are square.
Figure 13:
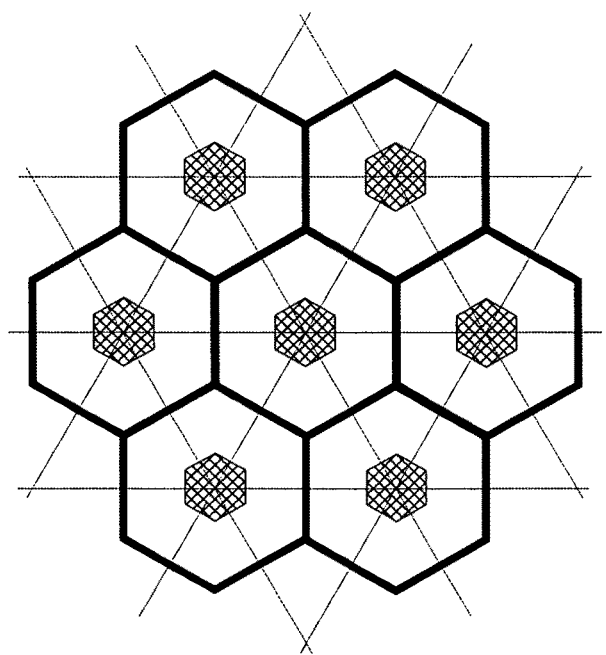
FIG. 13 illustrates an alternative embodiment of a magnifier plate, comprising a two dimensional array of hexagonal unit cells, where the individual MMMs are hexagonal.

Two popular geometrical patterns of two dimensional arrays in a plane are with unit shapes of a square and a hexagon as shown by bold lines in FIGS. 12 and 13, respectively. Therefore, the edge of a light entrance window of each MMM, which forms the unit area, is a square or a hexagon. A collimated light beam entering each unit area is converted into a collimated light beam with a smaller beam width and is emitted from approximately the center of the unit area. The output light beam from each MMM has a cross section shape which reflects the shape of the light entrance window or the unit shape. That is, the shape of the cross section of the output beam is the same as the unit area but compressed by the factor which is inverse of the magnification. The cross sections of the output beams are indicated with hatched areas in FIGS. 12 and 13. With the given design parameters, the output beam width is ⅓ of the size of the unit area. If the unit shape is a square, the emitted beam positions, that are the centers of unit areas, create a square pattern (FIG. 12). If the unit shape is a hexagon, the emitted beam positions create an equilateral triangle pattern (FIG. 13).

The MMM has a hole at the center of the concave mirror. Since the area around the hole is a mirror, no light should travel to the eye from the area other than the hole. The concave mirror works as an aperture and undesirable light is blocked to help maintain a good image quality. As mentioned earlier, if the eye side of the concave mirror is black in color or is a light absorptive surface, the undesirable reflections on the eye side of the mirror can be avoided.

Figure 14:
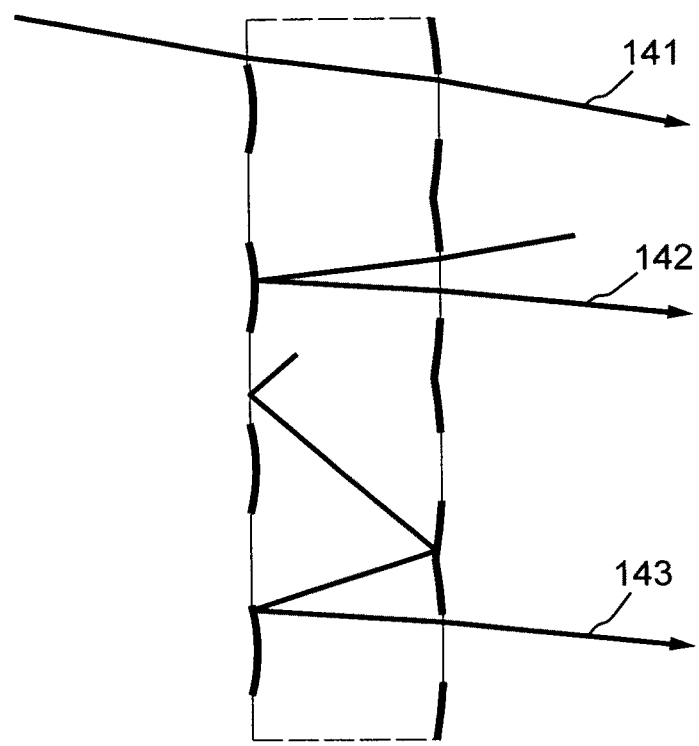
FIG. 14 illustrates three undesirable rays through the MMM to the eye.

Three light paths which could cause degradation of image quality are shown in FIG. 14. The light of direct pass-through, 141, is the light traveling through the entrance window and the exit window without reflections by the mirrors. Since the size of the convex mirror is reasonably larger than the size of the light exit window, this light has a certain minimum angle from the axis. Therefore, this light is out of the view angle. The light of direct reflection, 142, is the light entering the hole from the eye side and being reflected back by the convex mirror. The amount of this light can be estimated using FIG. 8. This light comes from the area that is an image of the light exit window viewed in the convex mirror. With the given design parameters, the diameter of the light exit window is about ⅓ of the size of the unit area and convex mirror further compresses the image into a ⅓ size. Therefore, the image of the light exit window viewed in the convex mirror is about ⅑ in diameter and the estimated light power is about ¹⁄₈₁ or equivalent to 1.2% reflection. The light of multiple reflections, 143, is mainly the light traveling to the convex mirror from a neighboring concave mirror. With the given design parameters, the angle of this light at the entrance window is greater than the critical angle and the light cannot enter directly through the window.

Figure 15:
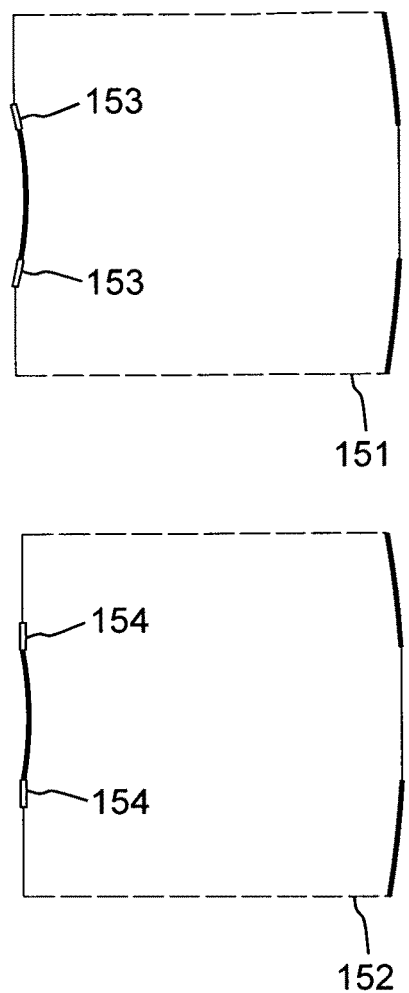
FIG. 15 illustrates the MMMs with light absorptive areas near the circumference of the convex mirror.

As indicated in FIG. 6, the diameter "$D_B$" of the convex mirror is designed to be greater than the diameter "$D_C$" of the light exit window. This condition of design is desirable to prevent the light of direct pass-through, which was illustrated at 141 in FIG. 14, from traveling within the view angle. As can be seen in FIG. 8, the light beam at position B does not hit the area near the circumference of the convex mirror, even with off-axis beams. Therefore, the area near the circumference of the convex mirror does not necessarily need to be reflective. Actually, it may be better that the area near the circumference of the convex mirror facing inside of the MMM is light absorptive, such as black in color or with a light absorptive structure. This is because the light of multiple reflections, illustrated at 143 in FIG. 14, is reflected by the area near the circumference of the convex mirror, and that light will be suppressed if the circumference area is made absorptive as shown at 153 on a MMM 151, in FIG. 15 (top). This concept can be extended to a modified design where the area near the circumference of the convex mirror can be in any shape, not limited to the convex shape. For example, the shape of the light absorptive area, which is near the circumference of the convex mirror, may be flat and is part of light entrance window shape as shown at 154 on a MMM 152, in FIG. 15 (bottom), or any other shape.

Also, as can be seen in FIG. 8, the light beam at position B does not hit the area near the center of the convex mirror. Therefore, if the area near the center of the convex mirror facing inside of the MMM is light absorptive, such as black in color or with a light absorptive structure, the light of direct reflection, illustrated at 142 in FIG. 14, can be reduced. In this case, too, the area near the center of the convex mirror can be in any shape, including flat.

Figure 16:
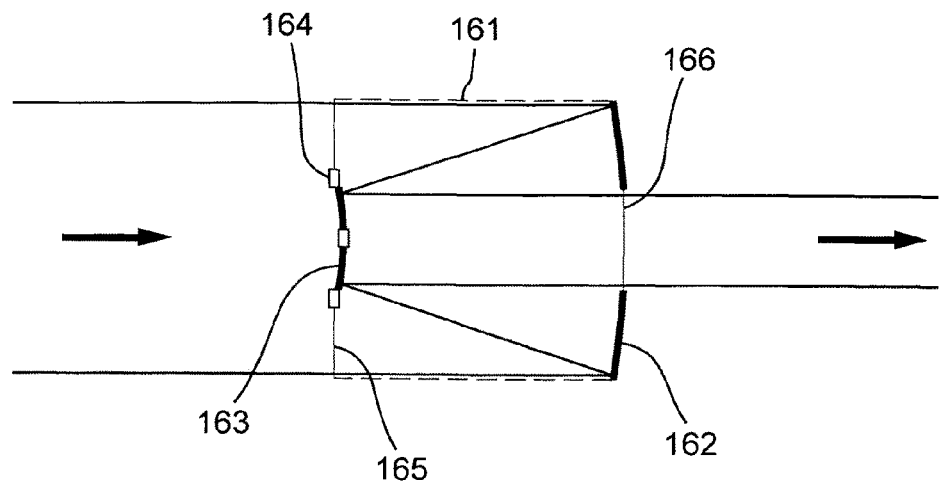
FIG. 16 shows the side view of and the front view from inside of the MMM with light absorptive areas.
Figure 16:
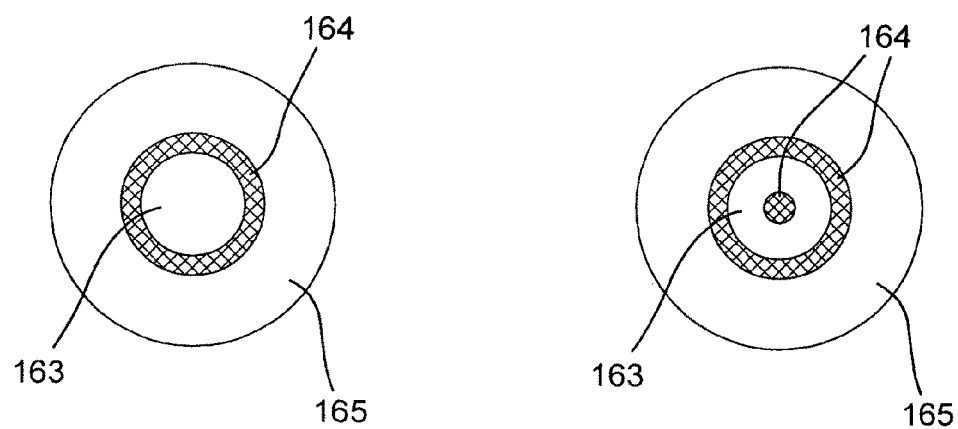

The light rays traveling through the MMM 161 are illustrated in the side view in FIG. 16 (top). The MMM consists of the concave mirror 162, the convex mirror 163, the light absorptive areas 164, the light entrance window 165, and the light exit window 166. The light absorptive areas are also shown as the front view in FIG. 16 (bottom). In the front view from inside of the MMM, the light absorptive area is provided between the convex mirror and the light entrance window (left). In addition, the light absorptive area is also provided near the center of the convex mirror (right). The light absorptive area in the center is effective to suppress the light of direct reflection illustrated at 142 in FIG. 14.

Although the front view of the MMM in FIG. 16 looks circular, it does not have to be a circle. It can be in any shape, including a square, a hexagon, and part of area between concentric circles, as will be described later.

As was explained earlier in FIG. 4, the gaps between the light beams do not affect, in principle, the image of the object created on the retina in the eye, as long as the gap is small enough compared to the diameter of the eye pupil. This is true, as long as the crystalline lens of the eye has no geometrical aberrations and does not respond to the entering beam position, which may or may not occur. If the crystalline lens has aberrations, the quality of the image may be affected. In this case, smaller gaps between the light beams will create an image of better quality in the eye. In other words, making the gap smaller than the eye pupil is only a minimum requirement. It is useful for creating an image of good quality that the gap is made even smaller. As shown in the one dimensional model of FIG. 4, the gap is determined by the transversal dimension of the MMMs and the width of light beams emitted from the MMMs. In the practical case using a two dimensional model, the gap is the spacing between the hatched areas in FIGS. 12 and 13. For many applications it will usually be preferred if this distance is less than 15 mm.

To realize small gaps using a reasonable size of the MMMs, the gap between the adjacent beams at the output of the magnifier plate can be further reduced by adding an optical component as an embodiment of the present invention. This additional function is provided by a two dimensional array of MBMs, defined as a beam multiplier plate. The function and structure of the beam multiplier plate will be described below.

Figure 17:
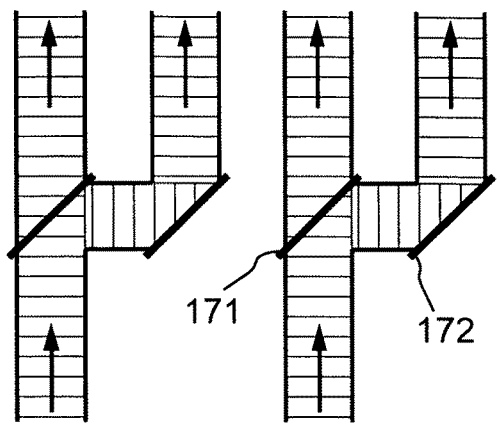
FIG. 17 illustrates an additional embodiment of the invention wherein blank portions of the output light are filled by splitting the primary beam into two beams.
Figure 18:
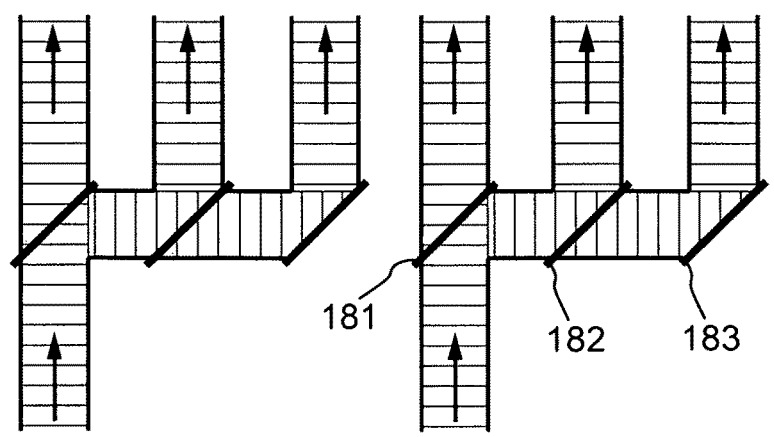
FIG. 18 illustrates an embodiment similar to that of FIG. 17 wherein the primary beam is split into three beams.

A MBM consists of a plurality of reflective surfaces, which are partial or total reflection mirrors shown schematically in FIGS. 17 and 18. Individual MBMs are positioned to receive the light beam emitted from each MMM and collectively produce multiple light beams having the identical beam profile and the same traveling angle. The total optical power is also unchanged by the MBMs, assuming no optical loss in the MBMs. Therefore, new light beams are produced in the gaps between adjacent light beams from the MMMs. This effectively reduces the size of gaps, and in some cases, almost eliminates the gaps.

The function of two of many MBMs in one dimension in the array splitting the primary beam into two beams are illustrated in FIG. 17. The function of two of many MBMs in one dimension in the array splitting the primary beam into three beams are illustrated in FIG. 18. They employ partial and total reflection mirrors, 171, 172, 181, 182, and 183. The optical powers among the output beams do not necessarily need to be equal. They can be made equal if, in the case of FIG. 17, the reflectivities are mirror 171=50% and mirror 172=100%, and in the case of FIG. 18, the reflectivities are mirror 181=67%, mirror 182=50%, and mirror 183=100%.

Figure 19:
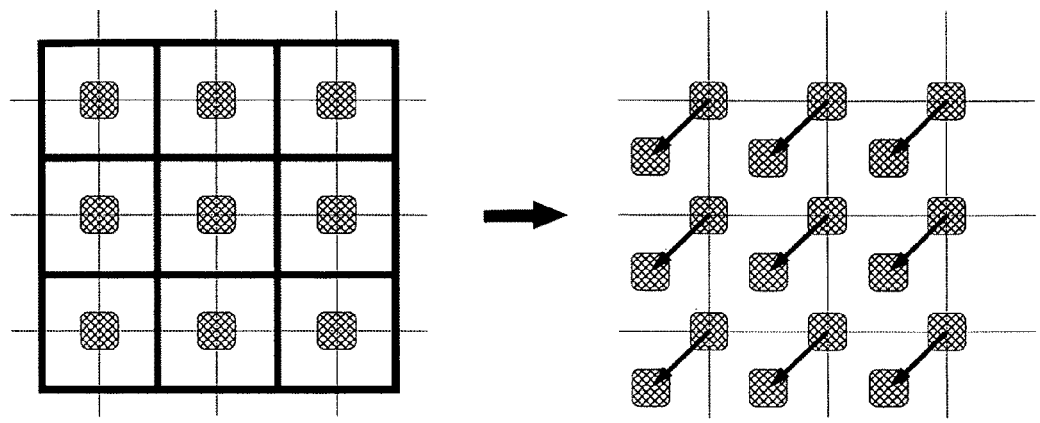
FIG. 19 shows the result of the beam multiplier plate of FIG. 17 applied to the array of FIG. 12.
Figure 20:
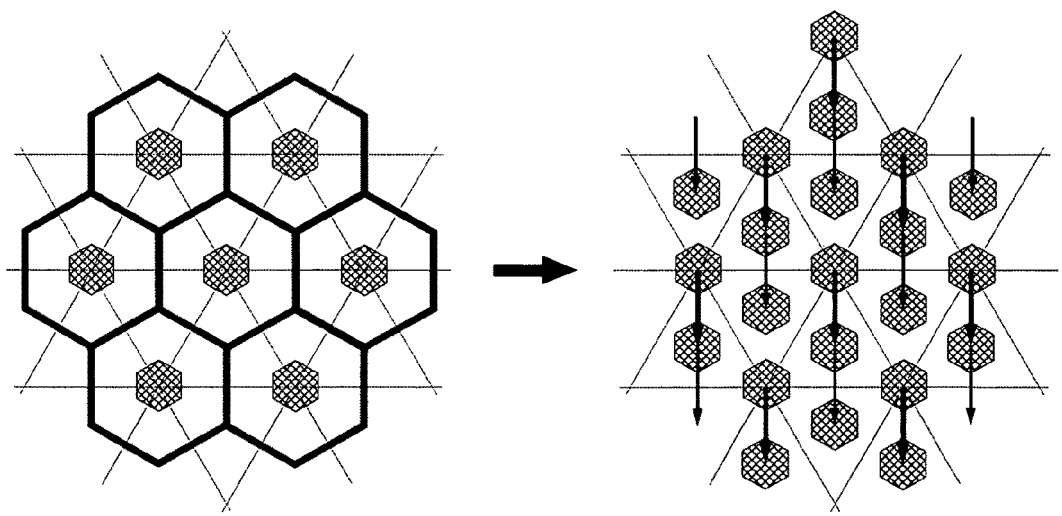
FIG. 20 shows the result of the beam multiplier plate of FIG. 18 applied to the array of FIG. 13.

For illustration, MBMs for two beam output as shown in FIG. 17 may be used for the magnifier plate with a square unit shape and MBMs for three beam output as shown in FIG. 18 may be used for the magnifier plate with a hexagon unit shape. In the case of the square unit shape as shown in FIG. 12, each light beam emitted from a unit area is converted into two light beams, one at the original position and the other moved by $1/\sqrt{2}$ of the length of side of the square as shown in FIG. 19. In the case of the hexagon unit shape as shown in FIG. 13, each light beam emitted from a unit area is converted into three light beams, first at the original position, second moved by $1/\sqrt{3}$ of the length of side of the equilateral triangle, and the last moved by $2/\sqrt{3}$ of the length of side of the equilateral triangle, as shown in FIG. 20.

Figure 21:
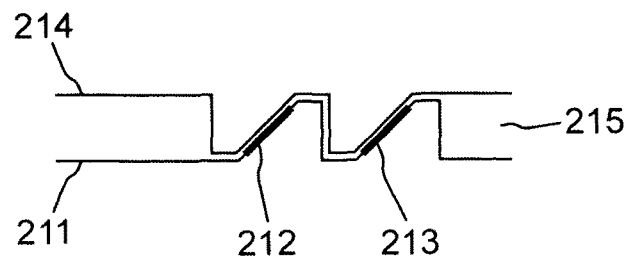
FIG. 21 illustrates a suitable structure for the beam multiplier plate of FIG. 17.
Figure 22:
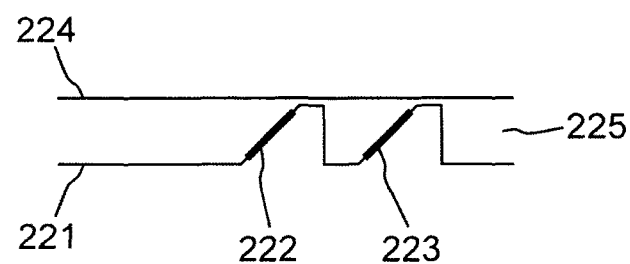
FIG. 22 illustrates an alternative structure for the beam multiplier plate of FIG. 17.
Figure 23:
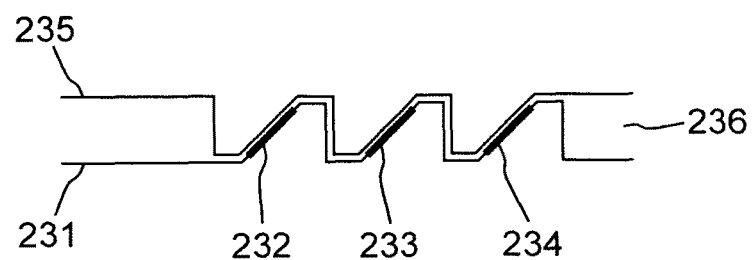
FIG. 23 illustrates a suitable structure for the beam multiplier plate of FIG. 18.
Figure 24:
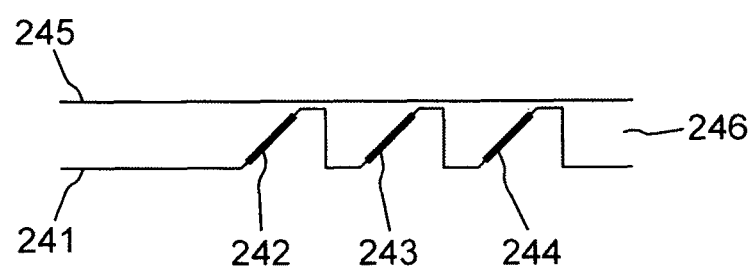
FIG. 24 illustrates an alternative structure for the beam multiplier plate of FIG. 18.

A practical beam multiplier plate may be fabricated using two plates, a base plate and a top plate, assembled together. An actual base plate may have an array of micro prisms on its surface. More precisely, the surface shape is with processes of trapezoid or triangle prisms. To implement the beam multiplier plate of FIG. 17, i.e., one beam to two beams, the base/top plates of FIG. 21 or 22 may be used. In FIGS. 21 and 22, the upper surfaces of the base plates 211 and 221 support an array of trapezoid prisms. The hypotenuses of the prisms 212 and 222 on the base plate have coatings corresponding to 171 in FIG. 17 and the hypotenuses of the prisms 213 and 223 on the base plate have coatings corresponding to 172 in FIG. 17. The lower surface of the top plate 214 in FIG. 21 has a mating surface with similar processes of trapezoid prisms and the lower surface of the top plate 224 in FIG. 22 is planar. To implement the beam multiplier plate of FIG. 18, i.e., one beam to three beams, the base/top plates of FIG. 23 or 24 may be used. In FIGS. 23 and 24, the upper surfaces of the base plates 231 and 241 support an array of trapezoid prisms. The hypotenuses of the prisms 232 and 242 on the base plate have coatings corresponding to 181 in FIG. 18, the hypotenuses of the prisms 233 and 243 on the base plate have coatings corresponding to 182 in FIG. 18, and the hypotenuses of the prisms 234 and 244 on the base plate have coatings corresponding to 183 in FIG. 18. The lower surface of the top plate 235 in FIG. 23 has a mating surface with similar processes of trapezoid prisms and the lower surface of the top plate 245 in FIG. 24 is planar. In each of FIGS. 21-24, the space between the base plate and the top plate is preferably filled with an index matching medium 215, 225, 236, and 246.

FIGS. 21-24 illustrate the case of trapezoid prisms and the shape of the surface in one dimension is shown as a side view in the figures. In the case of triangle prisms, the flat portion of the trapezoid prism at the top simply does not exist.

Figure 25:
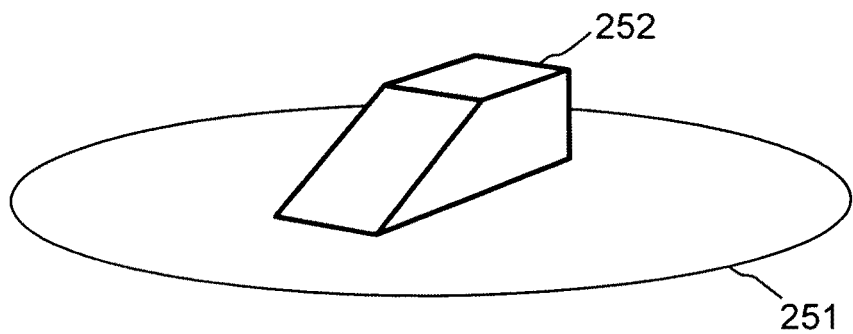
FIG. 25 is a perspective view of a reflecting element in the beam multiplier plate of FIGS. 21-24.
Figure 26:
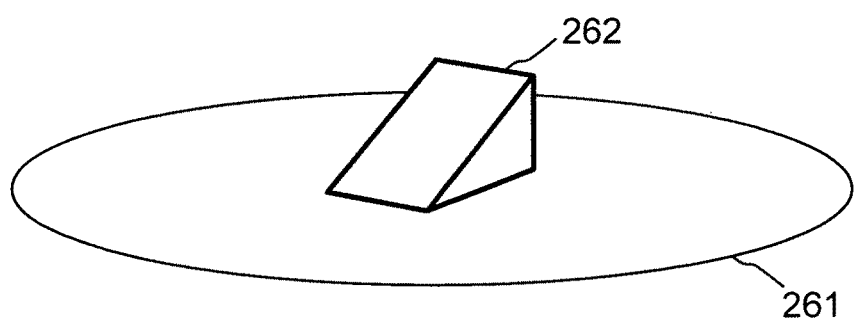
FIG. 26 is a perspective view similar to that of FIG. 25 showing an alternative structure for the reflecting elements.

In some cases, each MBM in the beam multiplier plate receives only the light beam emitted from a particular MMM. To receive a light beam emitted from a particular MMM only, the dimension of the trapezoid or triangle prism perpendicular to the plane of FIGS. 21-24 may need to be close to the size of the light beam diameter, or the size of the MMM. In such a case, to satisfy this requirement, the trapezoid or triangle prisms need to be three dimensional prisms. As an example, a base plate is shown in FIG. 25 with a single trapezoid prism 252 on the upper surface 251 of the base plate. As an example of a triangle prism, the prism 262 on the upper surface 261 of the base plate is illustrated in FIG. 26. As mentioned earlier, the hypotenuses of the prisms on the base plate have coatings with a reflectivity 50%, 67%, 100%, or other. Therefore, the trapezoid prism shown in FIG. 25 forms any one of processes of the trapezoid prisms in FIGS. 21-24, with the reflectivity on the hypotenuse surface 50%, 67%, 100%, or other. When the base plate and the top plate are assembled together, the beam multiplier plate with the function of FIG. 17 and/or FIG. 18 is formed.

Figure 27:
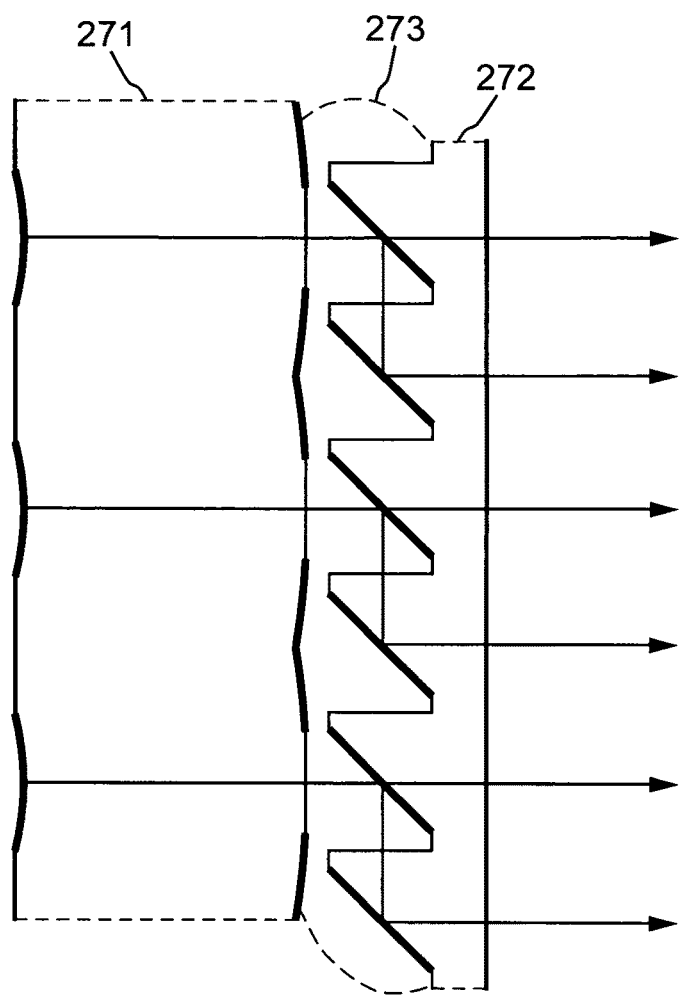
FIG. 27 is an expanded view showing a magnifier plate coupled to a beam multiplier plate.

It is noted that the top plate with a flat surface may be omitted if the prism side of the base plate is directly faced with the MMMs and the space between the base plate and the MMMs is filled with an index matching medium. As an example, the structure of the magnifying apparatus using MBMs that convert one beam into two beams is illustrated in FIG. 27. The light travels through the magnifier plate consisting of MMMs 271, index matching medium 273, and the beam multiplier plate 272.

To reduce optical losses, it is desirable to apply anti-reflection coatings to surfaces of the components, or to use reduced reflection surfaces for the components, or to match the index with the external medium.

Figure 28:
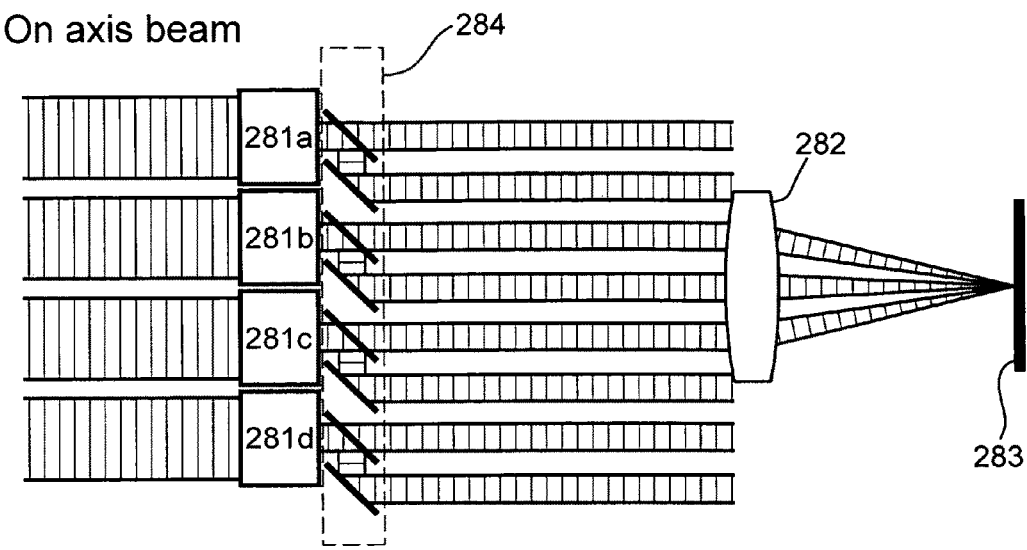
FIG. 28 is an illustration similar to that of FIG. 4, and when compared with FIG. 4, illustrates the improvement obtained using the beam multiplier plate according to one aspect of the invention.
Figure 28:
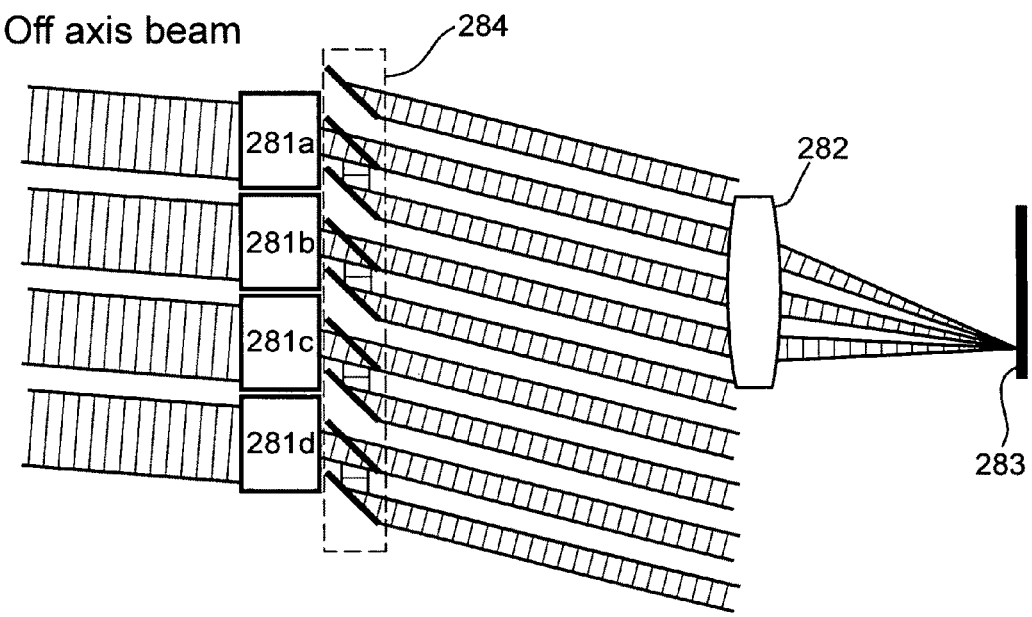
Figure 29:
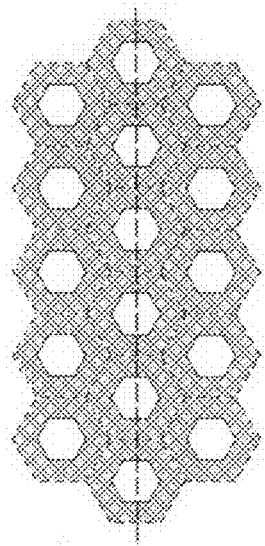
FIG. 29 is another illustration of the advantages of the beam multiplier plate of the invention comparing the view fields without a beam multiplier plate (top) and with a beam multiplier plate added (bottom)
Figure 29:
Figure 29:
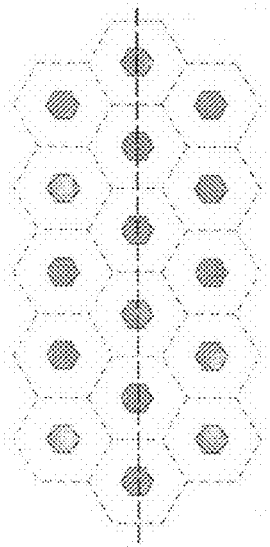
Figure 29:
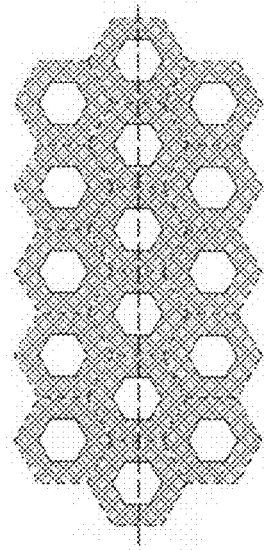
Figure 29:
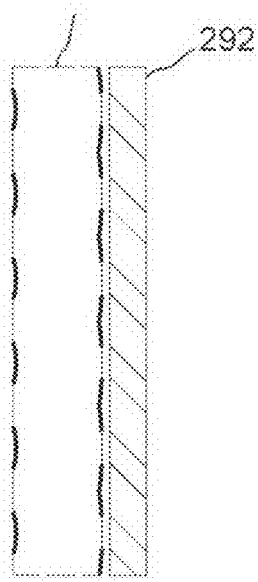
Figure 29:
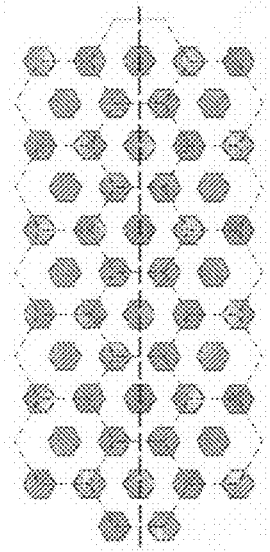

The side view of the light beams is shown in FIG. 4 when the beam multiplier plate is not used. When the beam multiplier plate is used, the side view of the light beams is illustrated in FIG. 28, where the reduced gaps between the light beams traveling toward the eye are evident. In FIG. 28, the magnifier plate comprises MMMs 281a-281d, the beam multiplier plate is shown at 284, and the crystalline lens and retina of the eye are shown at 282 and 283, respectively. The effect of using the beam multiplier plate is better illustrated in two dimensions in FIG. 29. This figure assumes that the unit shape of the MMM is hexagonal, the MBM produces three light beams from one beam, and the beam multiplication is performed in the way of FIG. 20. In FIG. 29, the view from the front shows the light entrance windows of the magnifier plate 291 with hatched areas. The white areas are areas where the light is blocked by the convex mirrors. In the view from the back, hatched areas show the areas from which the light is emitted. The effective gaps between the output light beams are the spacing between the hatched areas. Comparing the views from the back in FIG. 29 (top), which is the magnifying apparatus with a magnifier plate 291 but no beam multiplier plate, and FIG. 29 (bottom), which is the magnifying apparatus with a magnifier plate 291 and an added beam multiplier plate 292, it is obvious that the gaps are significantly reduced by using the beam multiplier plate.

Figure 30:
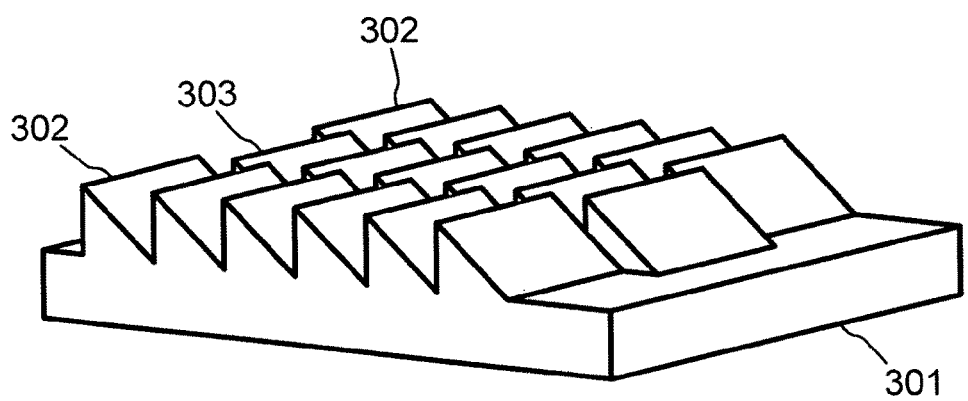
FIG. 30 is a perspective view of a base plate in a beam multiplier plate.
Figure 31:
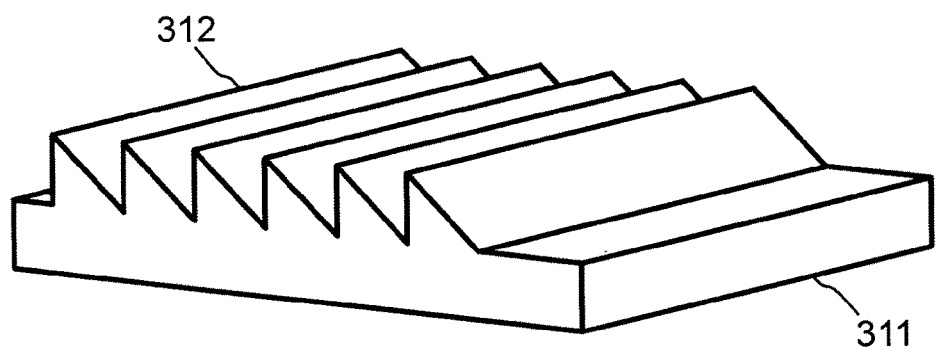
FIG. 31 is a perspective view of an alternative base plate in a beam multiplier plate.

Two examples of surface shapes for base plates of beam multiplier plates with triangle prisms are shown in FIGS. 30 and 31. In FIG. 30, each of prisms 302 and 303 built on the base plate 301 receives only one of light beams emitted from MMMs. In this case, prisms 302 are in every other columns, prisms 303 are in columns between the columns of 302, and rows with prisms 302 and rows with prisms 303 are out of phase by half the period. In FIG. 31, each of prisms 312 built on the base plate 311 receives multiple light beams emitted from MMMs. In this case, rows in all columns are in phase.

Figure 32:
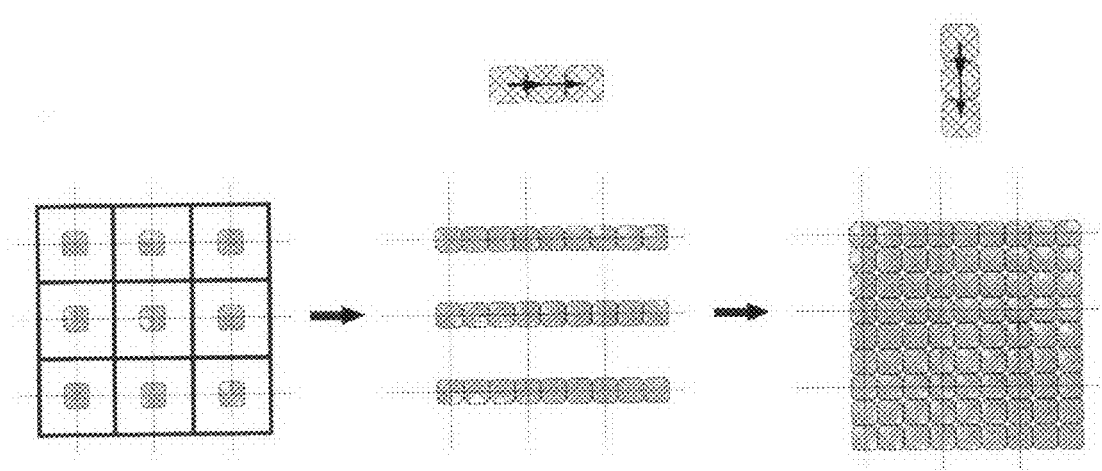
FIG. 32 illustrates the use of two beam multiplier plates with a square unit shape.
Figure 33:
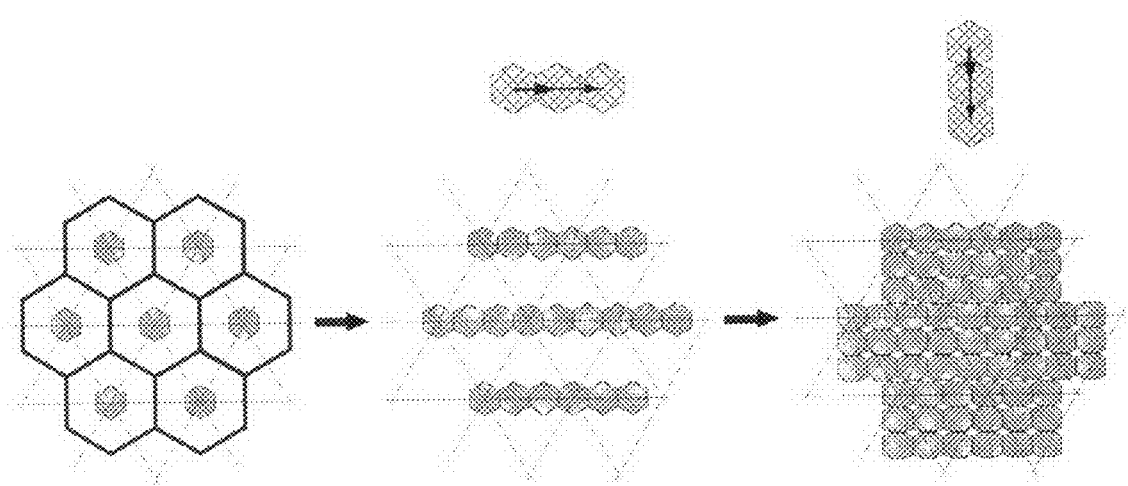
FIG. 33 illustrates the use of two beam multiplier plates with a hexagonal unit shape.

The gaps between the light beams can be further reduced by cascading the beam multiplier plates. If two of the plates illustrated in FIG. 31 are cascaded, where one produces light beams in the horizontal direction and the other produces light beams in the vertical direction, the gaps with the unit area of a square can be almost eliminated. This is illustrated in FIG. 32. Similarly, if the plates illustrated in FIGS. 30 and 31 are cascaded, where one produces light beams in the horizontal direction and the other produces light beams in the vertical direction, the gaps with the unit area of a hexagon can be significantly reduced. This is illustrated in FIG. 33.

There are several designs to cascade the beam multiplier plates whether the top plates are used or not. One design is to build the first prism array on one side of the base plate and the second prism array on the other side of the base plate. Another design is to combine two separate base plates with a prism array on one side of each base plate.

Figure 34:
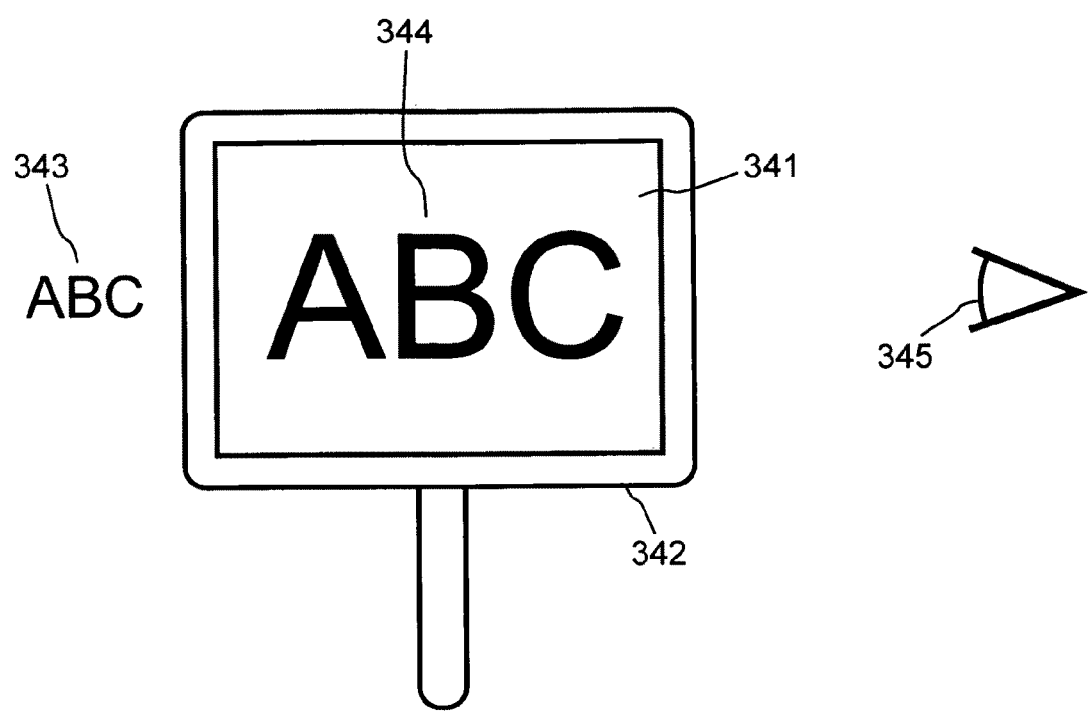
FIG. 34 is an illustration of a primary use of the magnifying apparatus of the invention for viewing objects at a distance.

The combination of the magnifier plate and the beam multiplier plate can be built within a thin plate. With the design parameters used for the analysis described earlier, the total thickness of the plate combination is about 3 mm. This plate combination itself can be used to view the magnified image of an object at a distance by simply looking through the thin plate. As shown in FIG. 34, a thin plate of the magnifying apparatus 341 can be held by a frame 342 with a handle. This handling is similar to a conventional magnifier to view an object at a short distance. Unlike conventional magnifiers, the object "ABC" 343 is far away or at infinity. By looking at the object through the magnifying apparatus, the eye 345 sees the magnified image 344 of the object.

Figure 35:
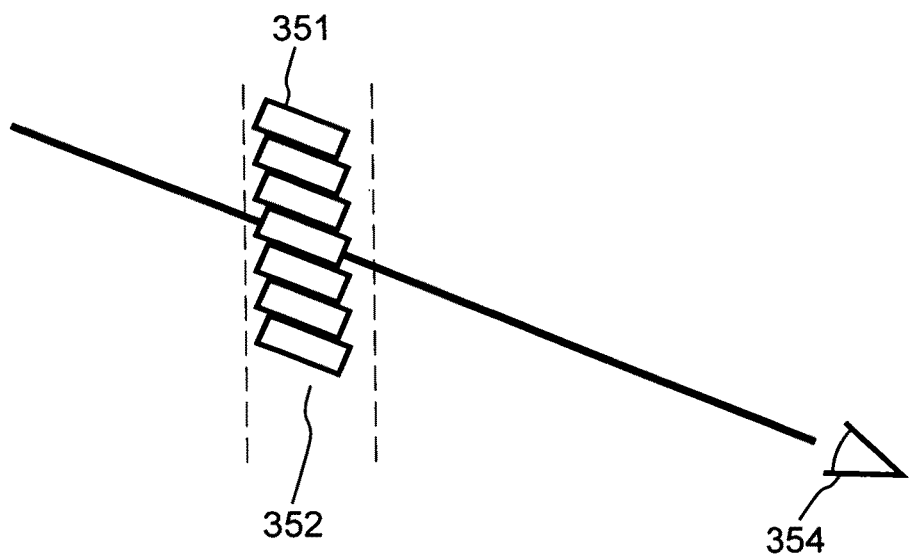
FIG. 35 shows two embodiments of a magnifier plate wherein the MMMs are tilted for viewing angles that are not normal to the plane of the magnifier plate.
Figure 35:
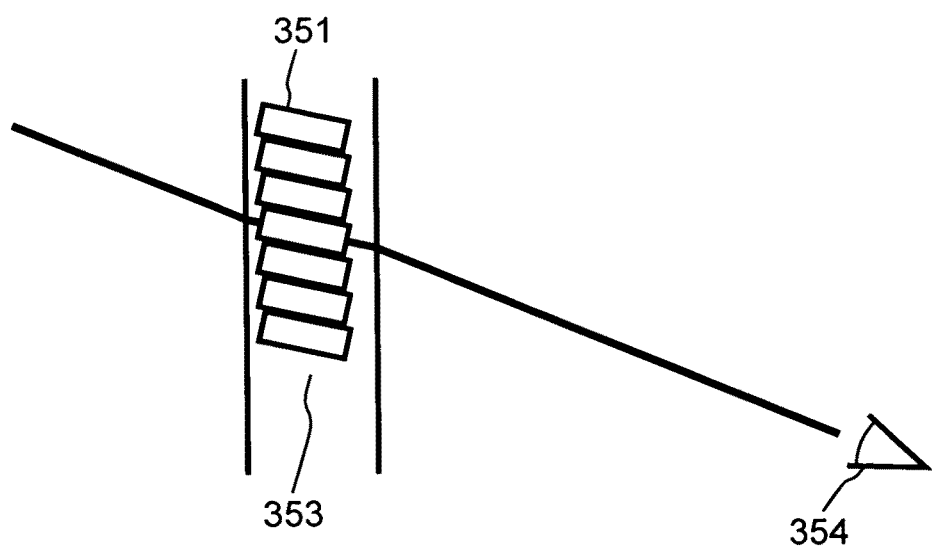

In some applications of the magnifying apparatus of the present invention, the magnifying apparatus may be installed with the plane of the magnifying apparatus angled from the light traveling direction. In such cases, the axis of the MMMs does not necessarily need to be exactly normal to the plane of the MMM array. As shown in FIG. 35, if the direction of the eye 354 has an angle from the normal direction to the plane of the MMM array, individual MMMs 351 may be angled so that their axes are parallel to the direction of rays traveling toward the eye, but are not normal to the MMM array. This design of tilted MMMs helps reduce aberration of the MMMs. If the MMMs with or without the MBMs are placed in the air 352, the actual axes of the MMMs are toward the eye. If they are placed in a transparent magnifier plate 353 such as glass and plastic, the axes are in the direction of light rays, which travel toward the eye after the refraction at the surface of the magnifier plate. This modification of tilted MMMs is especially useful when the magnifier plate is placed on an angled plane, such as for an automobile windshield.

One potential application of the present invention is the magnifying apparatus as an attachment to eyeglasses or eyeglass lens itself. Eyeglasses using the magnifying apparatus provides a light weight hands free magnifier. If eyesight is poor, it is usually corrected by using eyeglasses. However, if the poor eyesight is caused by complicated distortions of the crystalline lens or defects of the retina, eyeglasses may not be able to recover eyesight. In such cases, magnifying the image is a practical solution to view the object. The magnifying apparatus of the present invention can be embedded in at least a portion of the eyeglass lenses, so the image can be magnified through that portion, when necessary. An alternative way to use the magnifying apparatus with eyeglasses is for the magnifying apparatus to be assembled in a frame held by a hinged temple, and attached to the eyeglasses. The magnifying apparatus may be turned down into the line of sight when necessary.

Figure 36:
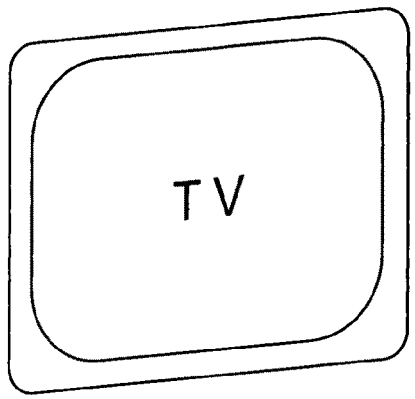
FIG. 36 shows applications of the present invention to eyeglasses (Hands free magnifiers)
Figure 36:
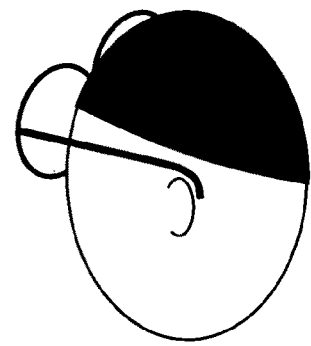
Figure 36:
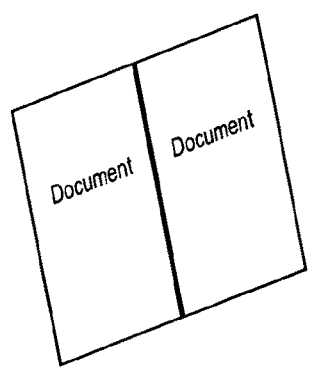
Figure 36:
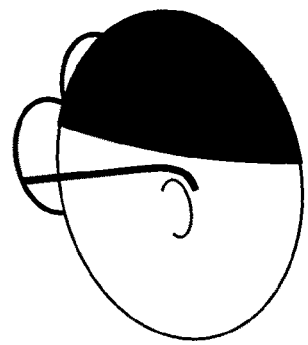

Using eyeglasses with the magnifying apparatus, people with poor eyesight can watch TV at a distance as shown in FIG. 36. People who use reading glasses but eyesight is not sufficient to read documents can also read documents without a magnifying lens as also shown in FIG. 36.

Figure 37:
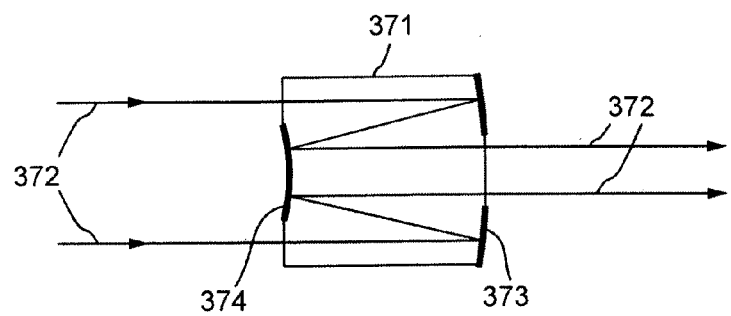
FIG. 37 illustrates one directional layout model of a MMM, where the image of object is viewed through the MMM.
Figure 37:
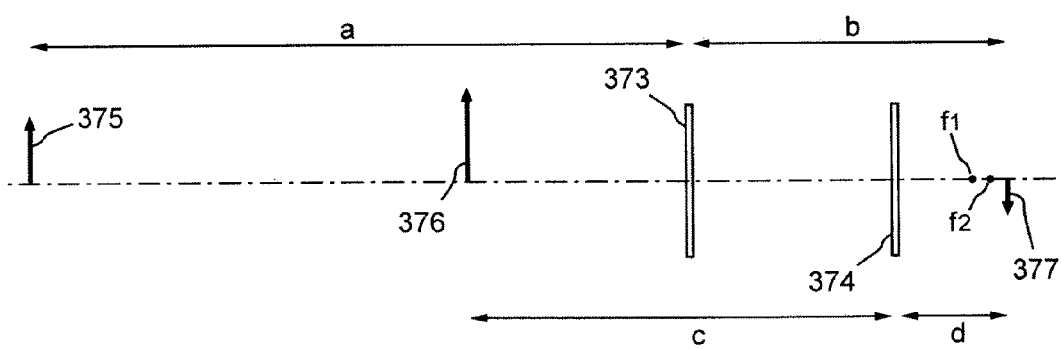

When the object is not at infinity or a far distance that is virtually infinity, the light rays arriving at the magnifying apparatus are not parallel to each other. A magnified image of the object is created at a certain distance instead. The distance to and the size of the magnified image are figured using FIG. 37. In the MMM 371, the actual light rays 372 travel back and forth between the concave mirror 373 and the convex mirror 374, as shown as actual light paths in FIG. 37 (top). However, for simple and easy explanation, all positions along the axis of the MMM, including the positions of the concave mirror and the convex mirror, are laid in one direction as shown as one directional layout in FIG. 37 (bottom). The concave mirror 373 creates the real image of the object 375, if the convex mirror 374 were not placed, and this real image is denoted as an invisible image 377 in this description. Next, the convex mirror creates the virtual image of the invisible image and this virtual image created by the convex mirror is denoted as the magnified image 376 in this description. Thus, the magnified image of the object can be viewed through the magnifying apparatus. As shown in FIG. 37, distances are defined as indicated here, a=the distance between the object and the concave mirror, b=the distance between the concave mirror and the invisible image, c=the distance between the magnified image and the convex mirror, and d=the distance between the convex mirror and the invisible image. The focal points of the concave mirror and the convex mirror are indicated as $f_1$ and $f_2$, respectively.

With a given distance a, which is virtually the distance to the object, b determines the horizontal position and the size of the invisible image. Once the focal length $f_1$ of the concave mirror is given, $1/a+1/b=1/f_1$ determines b. Then the size of the invisible image is given by the size of the object times b/a. Next, c and d determine the horizontal position and the size of the magnified image. Especially, the size of the magnified image is given by the size of the invisible image times c/d. As a result, the size of the magnified image is the size of the object times bc/ad. Since the dimensions of b and d are within or around the size of the MMM, which is typically 1-5 mm, b and d are very small compared to a or c. Therefore, they can be neglected when the distance to the object or to the magnified image is estimated. That is, the distance to the object is considered a and the distance to the magnified image is considered c. With $1/c+1/d=1/f_2$, c can be chosen from a wide range by making a minor adjustment on d or $f_2$.

As described above, the horizontal position and the size of the magnified image vary depending on the design parameters. FIG. 37 illustrates an example in which the magnified image is located closer to the MMMs than the object is located and the size of the magnified image is greater than the size of the object. In magnifying apparatus, the magnified image would look larger than the object even if the size of the magnified image is actually smaller than the size of the object, if the position of the magnified image is located closer to the eye than the position of the object is located.

Figure 38:
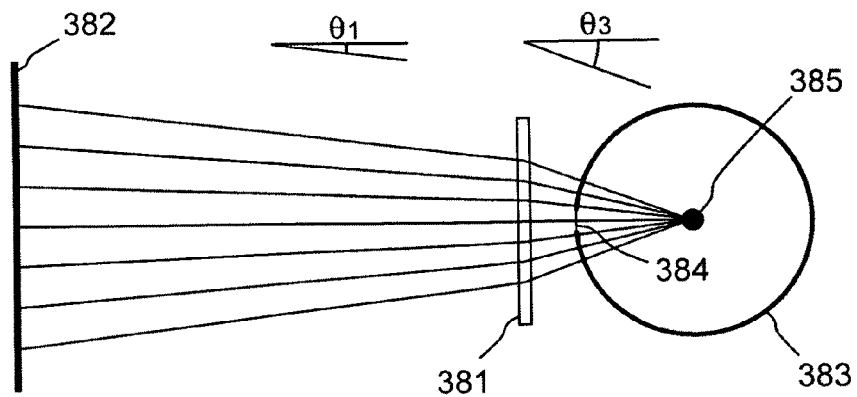
FIG. 38 illustrates light rays traveling through a flat magnifying apparatus and toward the rotation center of eyeball.

In an application of the present invention, when the magnifying apparatus is used for eyeglasses, the magnifying apparatus should work for light rays at a large travel angle in order to cover a large view area. This situation is illustrated in FIG. 38, where light rays of interest travel from the object plane 382 into the eye in a wide angle. Especially, the magnifying apparatus is designed so that all the light rays of interest travel toward a point, which is near the center of the eyeball as described below. In the case of eyeglasses, an advantage in designing the magnifying apparatus is that the magnifying apparatus 381 can be held to maintain the relative position between magnifying apparatus and the eyeball 383 unchanged. In addition, when the eye watches a view over a wide angle, the eyeball turns around a point, which is near the center of the eyeball, not near the position of the eye pupil 384. This point is considered the rotation center 385 of the eyeball. Thus, when the eyeball turns to watch a view at an angle, the rays of interest entering the eye are always about normal to the eye pupil.

The rays passing through the magnifying apparatus under two conditions provide a magnified image in a wide angle. The first condition is that the rays of interest converge at or near the rotation center of the eyeball. The second condition is the ratio of the input ray angle and the output ray angle $\theta_3/\theta_1$=constant, which condition was described in FIG. 3 as the relation between $\theta_1$ and $\theta_2$. In the case of wide view eyeglasses, these conditions should be satisfied for rays in the entire magnifying apparatus. As can be seen in FIG. 38, the light rays under these conditions travel through the magnifying apparatus at certain ray angles, which are determined by the vertical positions of individual MMMs. Therefore, individual MMMs do not need to work in the entire wide angle. They need to work only within a certain ray angle, which is determined by the vertical position of the MMM.

Figure 39:
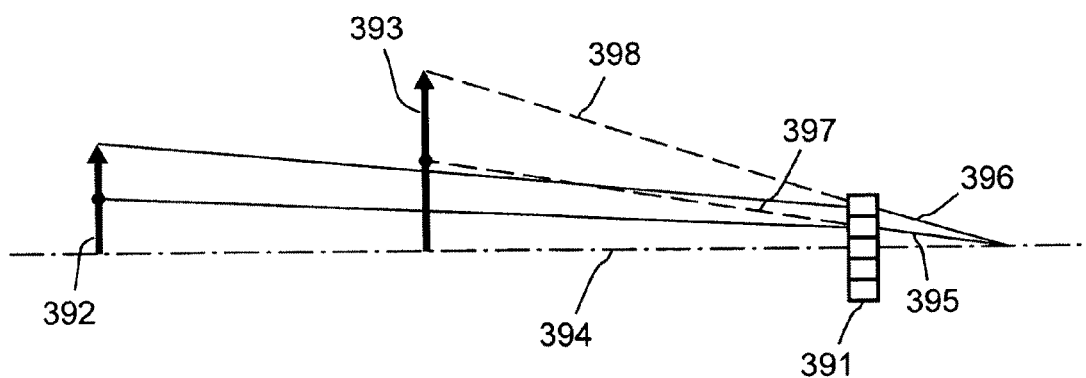
FIG. 39 is a light ray diagram illustrating the view of a remote object producing a single image in multiple MMMs.

In a magnifying apparatus, which is a two dimensional array of MMMs, the distances from individual MMMs to the object are approximately equal. Therefore, the distances from individual MMMs to the magnified image of the object are equal, as long as the MMMs are with the same design. In addition, the sizes of the magnified images in individual MMMs are also equal. FIG. 39 explains how the magnified image 393 of the object 392 created by different MMMs 391 can be made unique. This figure is the case in which the magnified image of the object is closer to the MMMs than the object is and the size of the magnified image is greater than the size of the object. The broken line 394 is the center axis of the magnifying apparatus. In this figure, three light rays from the object toward the rotation center of the eyeball, each traveling through one of three MMMs, are illustrated. These MMMs are located at the center, the second (upper), and the third (upper), respectively. The first ray along the center axis 394, originating at the bottom of the object, travels through the center MMM and it creates the bottom of the magnified image on the center axis. The second ray 395, originating at the middle of the object travels through the second MMM and creates the middle of the magnified image in the second ray direction 397. This is the extension of the second ray arriving at the rotation center of the eyeball. The third ray 396, originating at the top of the object, travels through the third MMM and it creates the top of the magnified image in the third ray direction 398. This is the extension of the third ray arriving at the rotation center of the eyeball. The objective is that all magnified images created by different MMMs are equal in horizontal position, vertical position, and size. As mentioned above, the magnified images are equal in the horizontal position and the size, as long as the MMMs are with the same design. The vertical positions of the magnified images in the MMMs can be made the same by maintaining the particular relation between angle $\theta_1$ of the ray entering the MMM and angle $\theta_3$ of the ray exiting from the MMM for all the MMMs, where $\theta_1$ and $\theta_3$ are angles similar to those defined in FIG. 3 as $\theta_1$ and $\theta_2$, respectively.

If the size of the magnifying apparatus is small enough compared to the distance from the magnifying apparatus to the object, this relation is $\theta_3/\theta_1$=nearly constant and this number should be equal to the magnification of the MMMs. If the distance from the magnifying apparatus to the object is not long enough, the ratio $\theta_3/\theta_1$ may not be a constant, but will vary only slightly over the magnifying apparatus.

As can be seen in FIGS. 38 and 39, the light rays travel at angles with respect to the axis of the magnifying apparatus when they travel through off-center MMMs. The farther the MMM is located from the center of the magnifying apparatus, the larger the light traveling angle is. If all MMMs are in the normal direction to the plane of the magnifying apparatus and the condition $\theta_3/\theta_1$=nearly constant can be maintained over the magnifying apparatus, the light traveling angle is not an issue. The specification that the ratio is nearly constant allows some small deviation in this ratio. An acceptable deviation may be considered to be less than 20%, and for preferred quality, less than 1%.

Parabolic mirrors work with little aberrations for not only paraxial rays, but also for rays away from the center axis, as long as the rays travel at small angles from the axis. However, when the rays are traveling at a large angle with respect to the axis, the aberrations will increase and the MMM will not keep $\theta_3/\theta_1$ nearly constant, as was shown in FIG. 9. Thus, the view angle of the magnifying apparatus made with all MMMs in the normal direction to the plane of the magnifying apparatus may be is limited.

In general, a MMM works best with little aberrations for ray angles of zero or around zero, that is, the rays should travel in parallel to or at small angles from the axis of the MMM. Therefore, to satisfy this condition and suppress the aberrations of the MMMs for a wide view angle, an optical component, which provides an offset of the ray angle, is introduced and attached to the MMM. This optical component is a ray angle adjuster (RAA) and is attached to each MMM to offset the ray angle within the MMM. By properly offsetting the ray angle with the RAA, a ray entering the magnifying apparatus at an input angle $\theta_1$ travel in parallel to the axis of the MMM within the MMM and exit from the magnifying apparatus at the output angle $\theta_3$, where $\theta_3/\theta_1$=nearly constant. By offsetting the ray angle for $\theta_1$ and $\theta_3$ of each MMM, all the rays travel in parallel to or at small angles from the axis of the MMM within the MMM and, after passing through the RAA, converge at the rotation center of the eyeball. The MMMs are not required to work for a wide range of ray angles, but the rays from all the MMMs converge at the rotation center of the eyeball. The MMMs are intended to work for small ray angles and the view angle of the magnifying apparatus can be extended without harmful aberrations.

Figure 40:
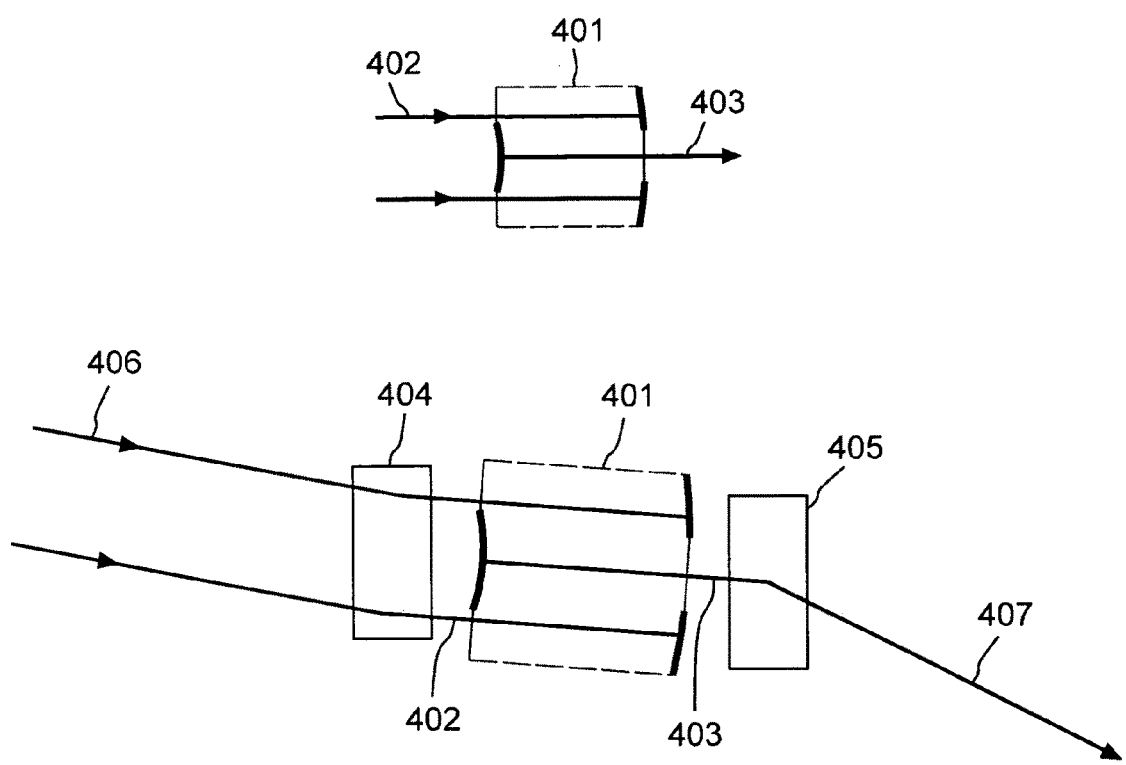
FIG. 40 shows paths of the light ray traveling through a RAA, a MMM and a RAA in this order.

The RAAs may be placed on both sides of the MMM or on either left or right of the MMM only. The angle offsets in an embodiment by the RAAs placed on both sides of the MMM 401 are shown in FIG. 40. In the figure, the paths of two input rays 402 and an output ray 403 of the MMM, which travel in parallel to the axis of the MMM, represent the rays. The paths of these input and output rays through the MMM are shown (top). With the first RAA 404 on the left of the MMM and the second RAA 405 on the right of the MMM added, the rays traveling through the first RAA, the MMM, and the second RAA are shown (bottom). These rays travel through the MMM in the direction parallel to the axis of the MMM and if the angle of input ray 406 to the first RAA changes slightly, the change of the angle of output ray 407 from the second RAA is enhanced by a factor that is the magnification of the MMM. The first RAA and the second RAA are designed to satisfy the condition that the output ray angle $\theta_3$ is the input ray angle $\theta_1$ times the magnification of the MMM. Since the MMM has the magnification necessary for the magnifying apparatus, the RAAs preferably do not have a magnification effect. However, if the first RAA has a magnification effect, the second RAA may be designed to cancel this magnification.

An RAA placed on at least one side of the MMM, where the light path from an object to the eye which passes through the MMM along the axis of the MMM and is converted by the RAA into a new light path, the extension of that path preferably passes a point, or within 1 cm of the point, where the distance from the point to the optical apparatus is smaller than 50 cm.

With the magnifying apparatus consisting of the MMMs and the RAAs, the rays, center or off-center of the magnifying apparatus, travel in their MMM in parallel to or at small angles from the axis of the MMM and converge at or near the rotation center of the eyeball as shown in FIG. 38.

Figure 41:
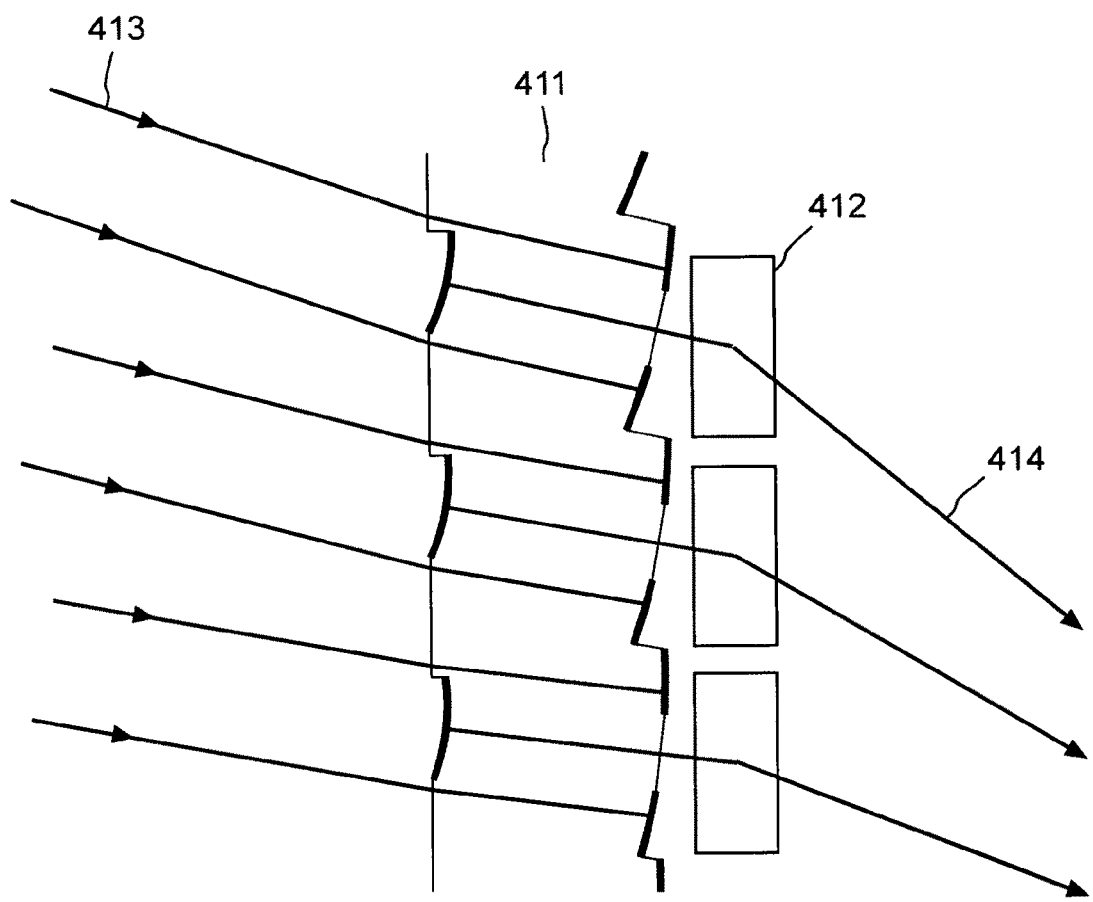
FIG. 41 is a view showing light rays traveling through a magnifier plate coupled to an angle adjuster plate.

In a typical design of the magnifying apparatus, light entrance windows of the MMMs in the magnifying apparatus form a single plane as shown in FIG. 41. The objective is that, after refraction of the input rays 413 at the light entrance window, the rays travel nearly parallel to the axis of the MMMs 411, where the MMMs are tilted. Off-center rays travel through the entrance window at angles and the ray angle would change at the entrance window. This angle change can be considered the effect of the first RAA in FIG. 40. The rays travel through the RAAs 412 and the ray angles are changed by the RAAs into the output rays 414.

In preferred embodiments the angle of the light path with respect to the center axis of the optical apparatus after passing through the optical apparatus is larger than the angle of light path with respect to the center axis of the optical apparatus before passing through the optical apparatus by a factor which is the magnification of, or within plus/minus 20% of the magnification of, the MMM.

Figure 42:
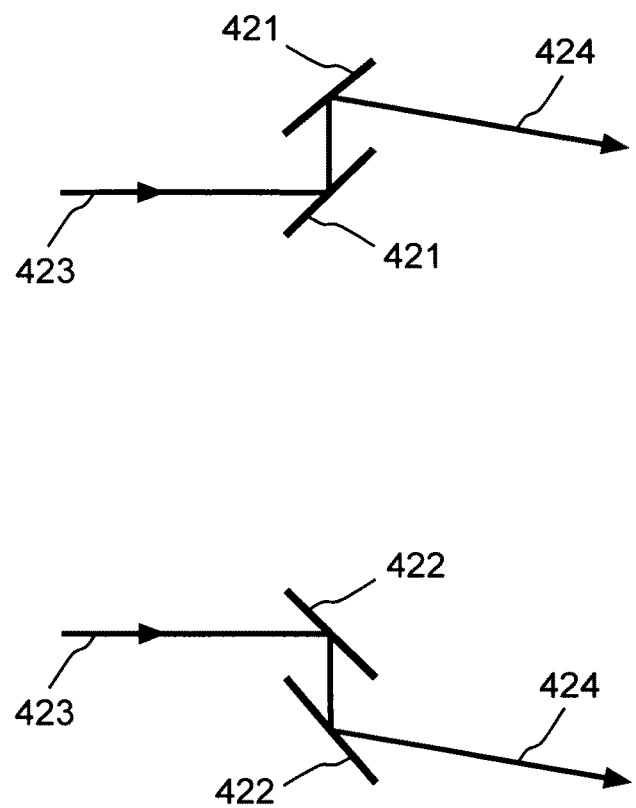
FIG. 42 shows two embodiments of a RAA consisting of a pair of non-parallel mirrors.

One possible design for an RAA is based on light refraction through a wedge as described below. The wedge may consist of more than one wedge to cancel the chromatic aberrations. Another design of the RAAs is based on light reflections through a pair of mirrors, which are not parallel to each other as shown in FIG. 42.

Whether the pair of non-parallel mirrors in one embodiment 421 is with reflection angle decreasing (top) or the pair of non-parallel mirrors in another embodiment 422 is with reflection angle increasing (bottom), the angle of the input ray 423 is changed into the angle of the output ray 424. This is a function of the RAA.

Figure 43:
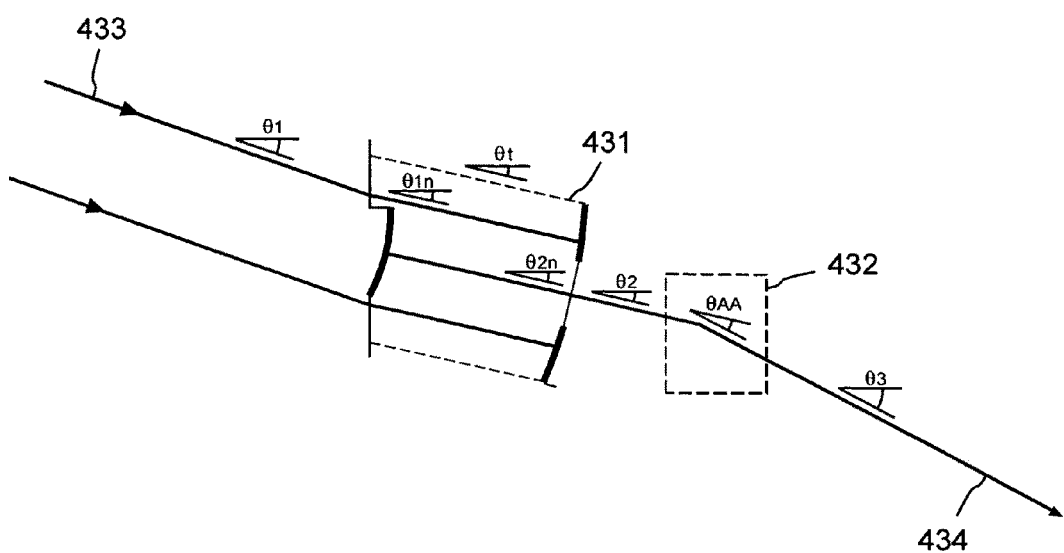
FIG. 43 defines ray angles of light traveling through a tilted MMM and a RAA.

The detailed path of the ray passing through the MMM and the RAA in FIG. 41 is shown in FIG. 43. The angle of the input ray 433 traveling in the air to the entrance window of the tilted MMM 431 is $\theta_1$. This ray is refracted at the entrance window of the MMM and continues to travel at an angle $\theta_{1n}$ in the medium (with a refractive index of n). The MMM, which essentially consists of a concave mirror and a convex mirror, is tilted by an angle $\theta_t$. The angle $\theta_t$ is chosen to be equal to the approximate average $\theta_{1n}$ within the MMM. Therefore, the effective ray angle in the MMM, which is $\theta_{1n}-\theta_t$, is small, that is, the ray travels nearly parallel to the axis of the MMM. The effective output angle from the MMM is $\theta_{2n}-\theta_t$, where $\theta_{2n}$ is the actual ray angle of the output from the MMM within the medium. After the ray travels at an angle $\theta_2$ in the air, the angle is further changed by a predetermined angle of $\theta_{AA}$ by the RAA 432 into the angle $\theta_3$ of the output ray 434.

Figure 44:
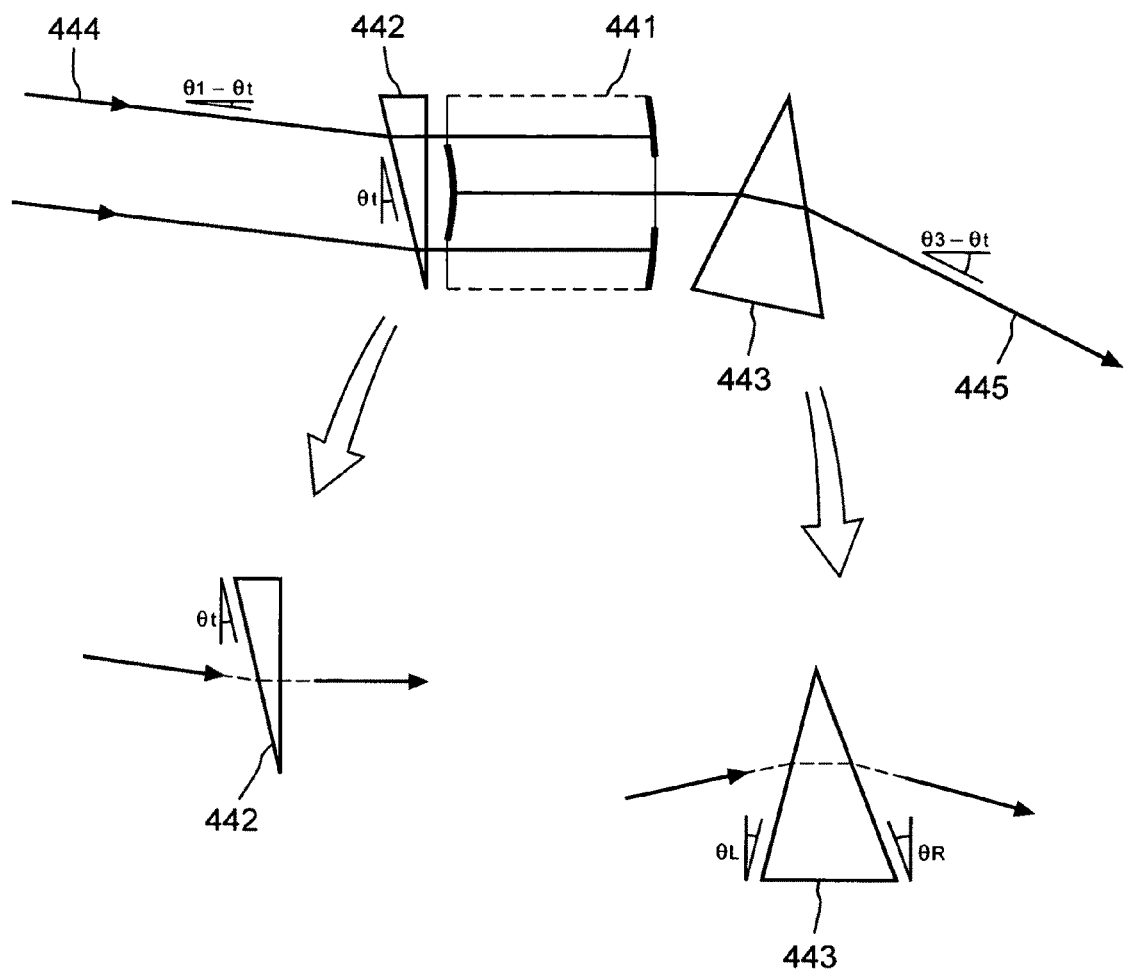
FIG. 44 illustrates changes of the ray angles in a model with a tilted MMM and wedges (RAAs)

Since the input ray travels through the entrance window at an angle in FIG. 43, the MMM can be considered as a MMM with a non-tilted entrance window and a wedge added on the left side of the MMM. When the RAA on the right side of the MMM is provided by a wedge, the combination of the tilted MMM and the RAA in FIG. 43 is modeled, as shown in FIG. 44, with a MMM with a non-tilted entrance window sandwiched by the first wedge 442 on the left of the MMM 441 and the second wedge 443 on the right of the MMM.

In the descriptions below, the magnification of the magnifying apparatus is assumed to be 3, and therefore, $\theta_3=3\,\theta_1$ or $d\theta_3/d\theta_1=3$ at a fixed wavelength $\lambda$, where $\theta_1$ is the angle of input rays 444 and $\theta_3$ is the angle of output rays 445. For the magnification of 3 for the magnifying apparatus, each MMM also should have the magnification of 3. That is, $\theta_{2n}-\theta_t=3\,(\theta_{1n}-\theta_t)$ as can be seen in FIG. 43.

As an example of a MMM, the design parameters are estimated when $\theta_1=\frac{1}{9}$ radians and $\theta_3=\frac{1}{3}$ radians. With the refractive index of the first wedge $n_1=1.7$, $\theta_1=\frac{1}{9}$ radians gives $\theta_t=3.74$ degrees. As shown in FIG. 44, the tilting angle $\theta_t$ becomes the wedge angle of the first wedge. Therefore, the change of ray angle by the second wedge should be $\theta_3-\theta_t=15.36$ degrees. Since the MMM provides the magnification of 3, the wedges do not need to provide a magnification effect to obtain $d\theta_3/d\theta_1=3$. Actually, the ratio of the input/output angle changes of the first wedge is 1.004 and is almost 1. This means the first wedge has almost no magnification effect. The small difference from 1 will be magnified by the MMM and may be canceled by the second wedge having asymmetric facets with $\theta_L$ and $\theta_R$. However, since the ratio is so close to 1, the cancellation may not be necessary. Therefore, the second wedge may have the symmetric facets with $\theta_L=\theta_R=\theta_W$. When the second wedge with the refractive index $n_2=1.5$ has the symmetric facets, $\theta_W=14.71$ degrees gives the angle change by the second wedge of 15.36 degrees, which is consistent with the number $\theta_3-\theta_t$ indicated above.

Figure 45:
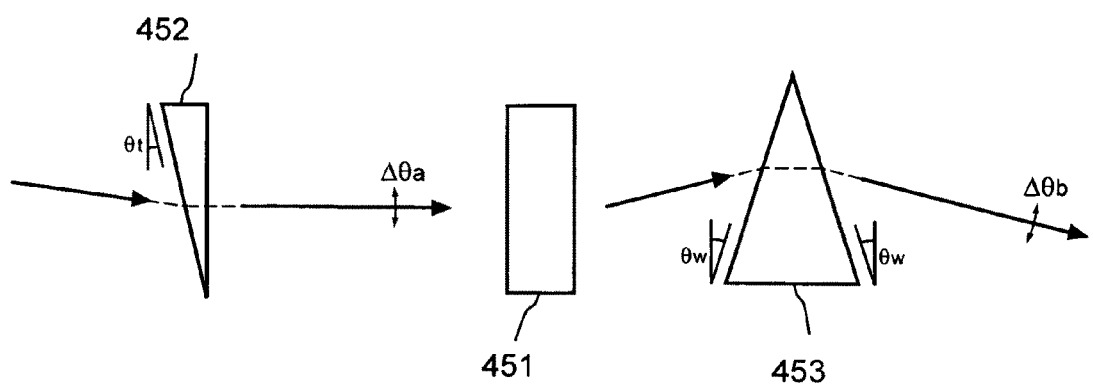
FIG. 45 shows chromatic angular dispersions of the wedges (RAAs)

Another requirement for the wedges is cancellation of chromatic aberration or condition for achromatic wedges, which is expressed as $d\theta_3/d\lambda=0$ at a fixed $\theta_1$. The chromatic aberration is calculated using the model shown in FIG. 45. The chromatic dispersion of the output angle $\Delta\theta_a$ with the first wedge 452 placed on the left of the MMM 451 is $d\Delta\theta_a/d\lambda=dn_1/d\lambda\,\tan\theta_t$. The chromatic dispersion of the output angle $\Delta\theta_b$ of the second wedge 453 placed on the right of the MMM is $d\Delta\theta_b/d\lambda=dn_2/d\lambda\,(2/n_2)\tan\theta_{Wa}$. Here, $\sin\theta_{Wa}=n_2\sin\theta_W$ and $n_1$ and $n_2$ are refractive indices of the first and the second wedges, respectively. Since the chromatic dispersion of angle with the first wedge is enhanced by a factor of 3 in the MMM, the achromatic condition is $d\Delta\theta_b/d\lambda=3\,d\Delta\theta_a/d\lambda$. This condition will be satisfied with $\theta_W=14.71$ degrees when the refractive indices $n_1$ and $n_2$ are 1.7 and 1.5 and the Abbe numbers $V_1$ and $V_2$ are 30 and 60 for the first and the second wedges, respectively.

As another example, the set of the design parameters, $n_1=1.6$, $n_2=1.5$, $\theta_t=3.97$ degrees, $\theta_W=14.51$ degrees, $V_1=27$, and $V_2=60$ also works.

Figure 46:
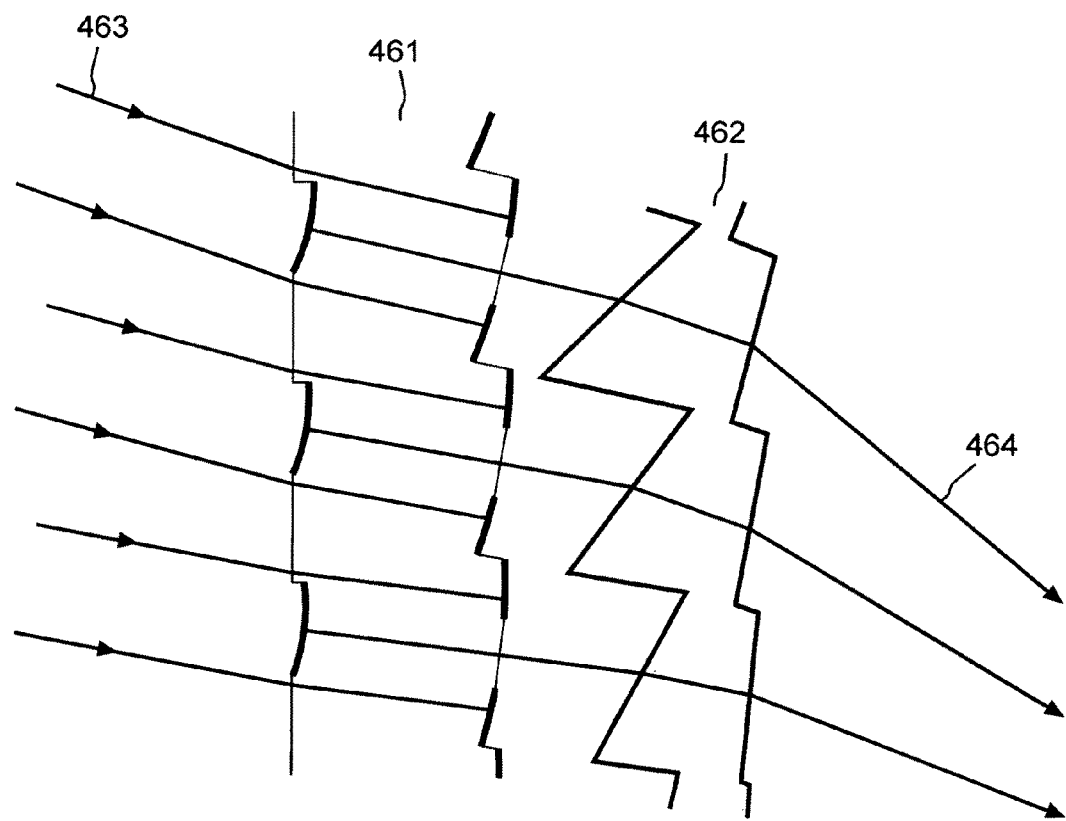
FIG. 46 illustrates light rays traveling through a magnifying apparatus consisting of tilted MMMs and wedges.

Using the wedges described above for the MMM array shown in FIG. 41, part of the actual structure of the magnifying apparatus is shown in FIG. 46. In the application of the magnifying apparatus to eyeglasses, the ray angle increases as the position of the input ray 463 and the output ray 464 moves from the center to the edge of the magnifying apparatus. The tilting angle of the MMMs 461, as well as the wedge angle of the wedges 462, increases gradually as the MMM position goes farther from the center of the magnifying apparatus, reflecting the entire appearance of ray paths shown in FIG. 38. In this figure, the wedges form a separate component from the MMMs.

The magnifying apparatus is a two dimensional array of MMMs with RAAs and/or MBMs attached if necessary. For use as eyeglasses, two of these magnifying apparatuses would be suitably attached together with the optical axes through the apparatuses parallel to one another. The popular patterns for two dimensional arrays are with unit shapes of a square (FIG. 12) and a hexagon (FIG. 13). When a magnifying apparatus is applied to eyeglasses, where the rays converge at the rotation center of the eyeball as shown in FIG. 38 and the ray angles have the center symmetry, a two dimensional pattern with the concentric symmetry may be an alternative pattern. A pattern with the concentric symmetry is illustrated in FIG. 47.

The pattern is based on concentric circles in the front view (top). The concentric circles with a nearly equal spacing divide the area of the magnifying apparatus into circular strips. Each circular strip between the adjacent concentric circles is further divided into small areas located along the circles. These small areas correspond to the unit areas of FIGS. 12 and 13, and each small area has its own MMM, and a RAA and/or a MBM, if necessary.

The difference in radii of the adjacent concentric circles determines the dimension of the small area in the radial direction. The spacing along the circles determines the dimension of the small area in the angular direction. Therefore, each small area is surrounded by four boundaries, where two of the boundaries dividing the areas in the radial direction are arcs. The arcs are part of the adjacent concentric circles. The two other boundaries dividing the areas in the angular direction are lines. The only exception is the center area, which is simply the smallest circle, or the smallest circle may be ignored. The boundaries do not necessarily need to be arcs or lines, and can be any suitable shapes. The dimensions of the area in the radial direction and the angular direction are preferably chosen to be comparable.

Figure 47:
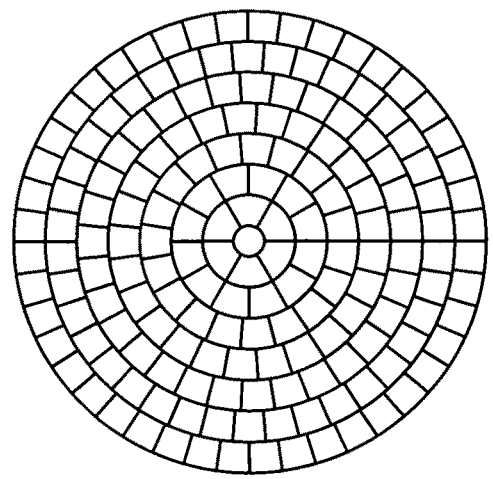
FIG. 47 is a front view of an alternative two dimensional array with concentric circles and a perspective view of the wedges in the concentrically circular array.
Figure 47:
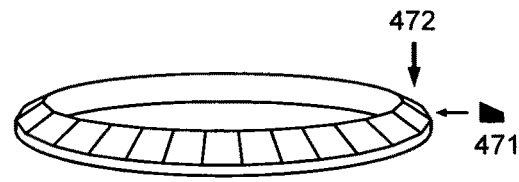

FIG. 47 also illustrates the perspective view (bottom) of the RAAs. In this view the RAAs appear as consisting of wedges. The angle adjuster plate is composed of concentric rings with angled surfaces on either side or both sides. The concentric rings may be one body or separate rings. In the figure, one of the rings is illustrated. The cross section 471 of the ring forms a wedge and the ray angle of the light 472 changes through the wedge.

Figure 48:
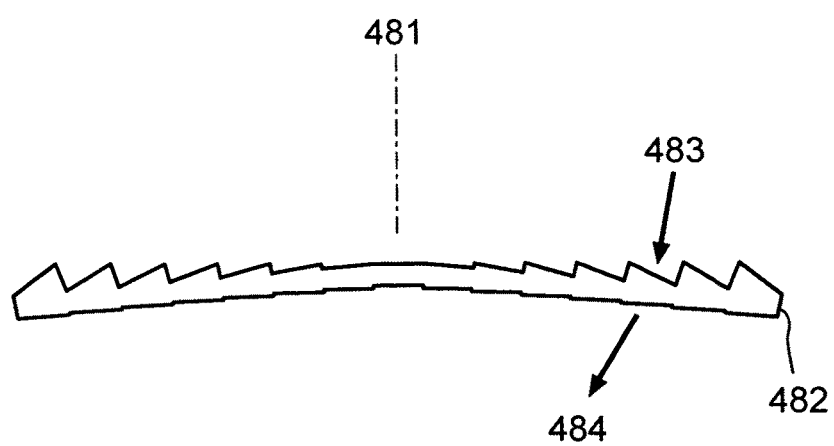
FIG. 48 illustrates the cross section of the concentrically circular array of wedges.

The angle adjuster plate in the front view of FIG. 47 is a circle and, if it is made as one body, the entire angle adjuster plate is a disk or part of a disk with wedge structures on the surfaces, where the facets of the wedges are tilted toward the center of the disk. The cross section of this disk along a radius is illustrated in FIG. 48. The wedge angle is zero at the center 481 and the wedge angle increases as the position of the wedge moves from the center to the circumference 482 of the disk. With this structure, the input ray 483 changes the traveling direction into the output ray 484 traveling toward the center axis of the disk.

The light beam emitted from a MMM occupies only a portion of the unit area, that is, a portion of the wedge facet. Therefore, the tips of the wedges in FIG. 48 are not used as RAAs and the tips can be taken off. This helps reduce the thickness of the angle adjuster plate.

Figure 49:
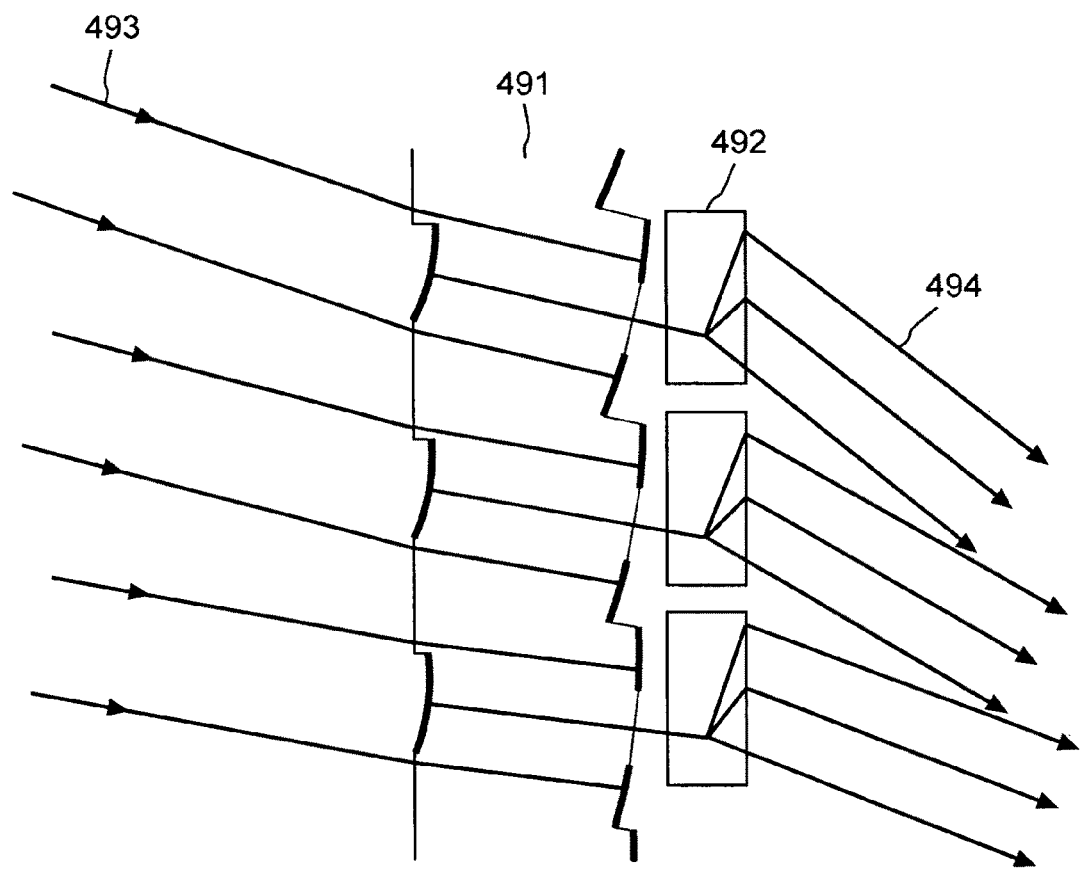
FIG. 49 illustrates light rays traveling through a magnifying apparatus consisting of tilted MMMs and RAA/MBM combinations.

If MBMs are added to the MMM/RAA combinations, each MBM multiplies the output light beam from the MMM/RAA combination and creates a plurality of light beams for the output of the MBM. The MBMs may be combined with the RAAs as one component: The tilted MMMs 491 with the RAA/MBM combinations 492 are schematically illustrated in FIG. 49. Similarly to FIG. 41, the input rays 493 are converted into output rays 494 with multiplied rays.

Figure 50:
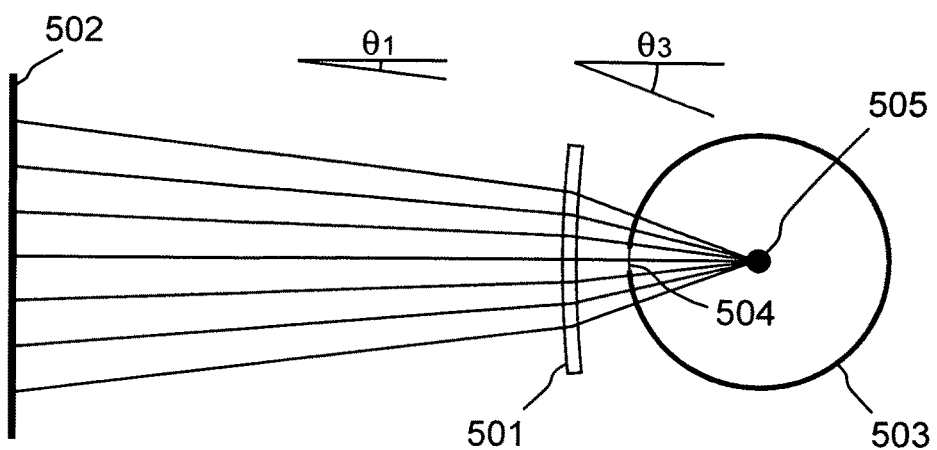
FIG. 50 illustrates light rays traveling through a curved magnifying apparatus and toward the rotation center of eyeball.

The magnifying apparatus in FIG. 38 was illustrated as a flat plate. However, there is no reason that the magnifying apparatus in the present invention needs to be flat. In the application to eyeglasses, it the apparatus works as long as the rays of interest travel toward the rotation center of the eyeball, and the ratio of the input ray angle and the output ray angle $\theta_3/\theta_1$=constant. Therefore, a magnifying apparatus with a curved surface, is another useful design, and is illustrated in FIG. 50. Similarly to FIG. 38, light rays from the object plane 502 change the traveling angles through the curved magnifying apparatus 501 from $\theta_1$ to $\theta_3$, toward the rotation center 505 of the eyeball 503. When the eye turns, the eye pupil 504 is maintained approximately normal to the direction of the incoming ray of interest. A curved magnifying apparatus may be preferred when used for eyeglasses.

Figure 51:
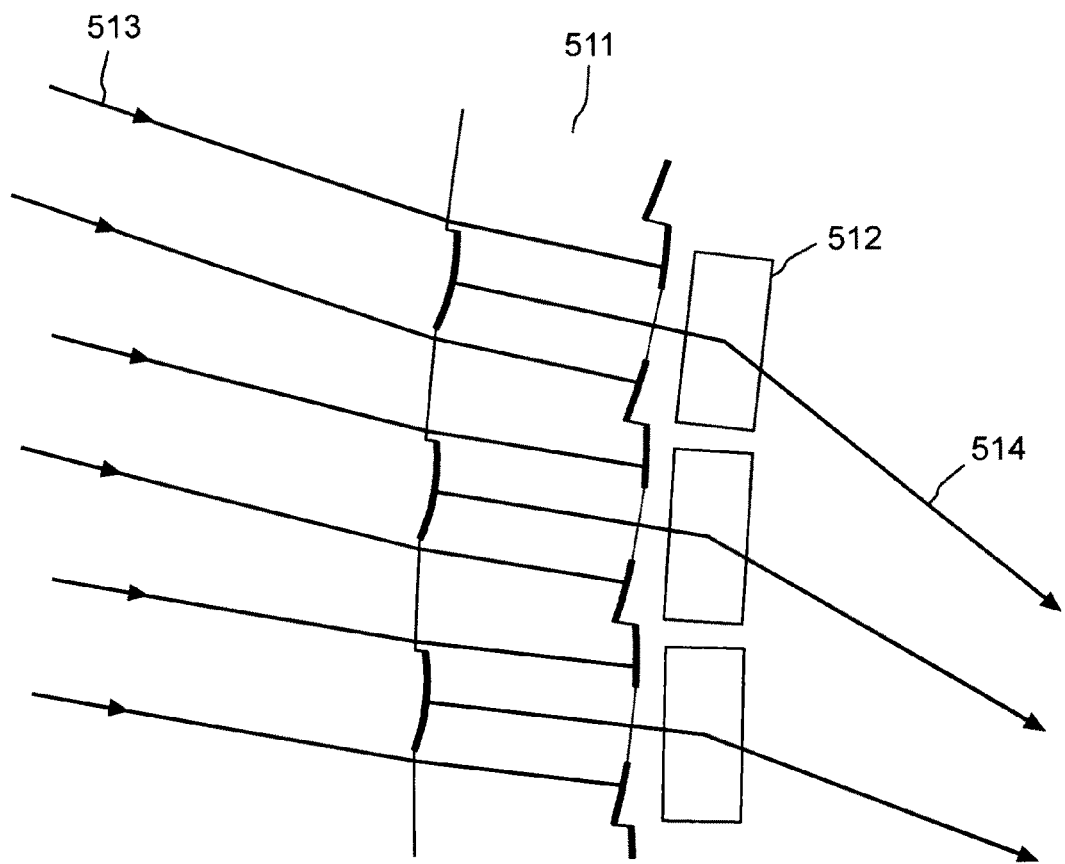
FIG. 51 illustrates light rays traveling through a curved magnifying apparatus consisting of tilted MMMs and RAAs.

Part of the structure with tilted MMMs 511 and RAAs 512 in a curved magnifying apparatus is shown in FIG. 51. Unlike the flat magnifying apparatus shown in FIG. 41, the light entrance windows of the MMMs are on a curved surface. Therefore, the light entrance window has a lens effect, which affects the conversion of the input light 513 into the output light 514. The lens effect changes the size and the horizontal position of the invisible image in FIG. 37.

Figure 52:
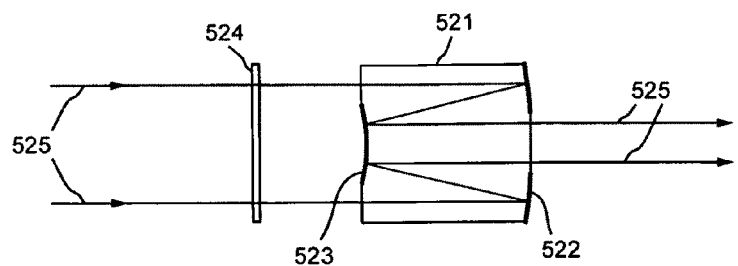
FIG. 52 illustrates one directional layout model of a MMM with a convex lens on the light input side.
Figure 52:
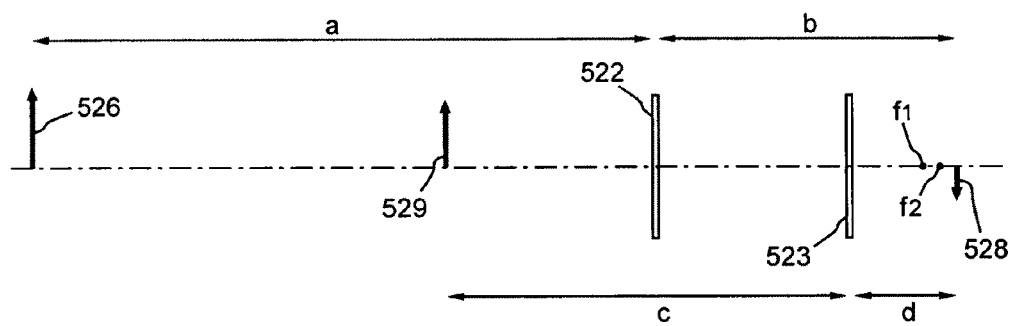
Figure 52:
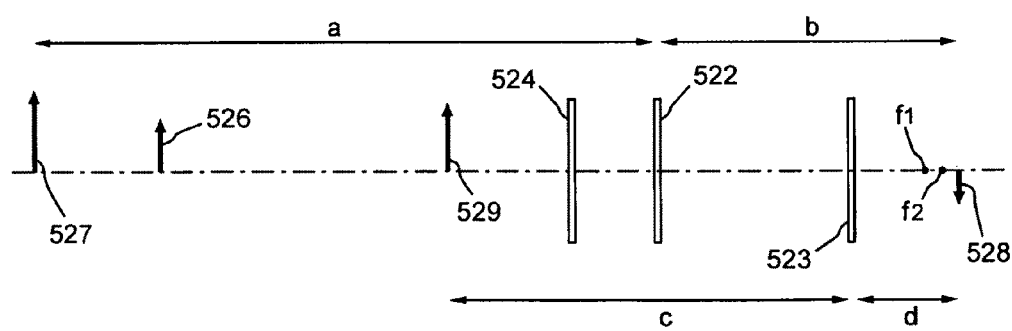

This lens effect on the rays 525 is modeled in FIG. 52 as a lens 524 placed on the object side of the MMM 521. In the MMM, the actual light rays travel back and forth between the concave mirror 522 and the convex mirror 523 as shown in the top of FIG. 52. Here, similarly to FIG. 37, all positions along the axis, including the positions of the concave mirror 522, the convex mirror 523, and the lens 524, are laid in one direction. Although FIG. 52 was provided to explain the lens effect on the surface of the curved magnifying apparatus, the same principle can be used to explain the attached lens adjacent to the magnifying apparatus.

The figure in the middle is without the lens effect and the figure in the bottom is with the effect of a convex lens placed on the object side of the MMM. With the lens effect, the object. 526 viewed from the MMM through the lens is changed in size and horizontal position. When the lens effect is with a convex lens, the object is viewed as if it is farther from the MMM than is the actual object is As shown in the bottom of FIG. 52, the virtual image 527 of the object viewed through the lens can be positioned at the same distance as the object with no lens effect (middle of FIG. 52), even though the actual object in the bottom figure is closer to the magnifying apparatus than the object is in the middle figure. Once the virtual image of the object in the bottom figure is created at the same distance as the object is in the middle figure, the MMM consisting of the concave mirror and the convex mirror works in the same way to create the same magnified image 529 in the middle and bottom figures. As a result, by attaching a convex lens on the object side, the magnifying apparatus works for an object at in a shorter distance.

If the lens effect is strong, a virtual image of the object may not be created by the lens. Whether the lens effect is strong or not, the combination of the lens and the concave mirror may create the invisible image 528 by adjusting the concave mirror. All modifications on the parameters such as the focal lengths and the positions of the focal points of the concave mirror and the convex mirror should be considered to be included in the invention.

When the magnifying apparatus in the present invention is used as the eyeglass lens whether with flat or curved surface, it may be attached by a concave or a convex lens covering the entrance windows of the magnifying apparatus. Even though the focal length of the concave lens or the convex lens may be long and the lens may have a weak effect, the lens works to change the size of, and the distance to, the object when viewed through the lens.

As described above, the image of an object viewed through a convex lens is may appear to be at a longer distance from the MMM than is the actual object is. If the magnifying apparatus in eyeglasses is designed for an object at a certain distance, an object at a shorter distance can be viewed with the same magnifying apparatus by attaching a convex lens. One of such examples is a magnifying apparatus designed to watch TV as shown in FIG. 36 (top), which is about 3 m away from the eyes, can also be used to read documents as shown in FIG. 36 (bottom), which are about 40 cm away from the eyes, by attaching a convex lens.

Figure 53:
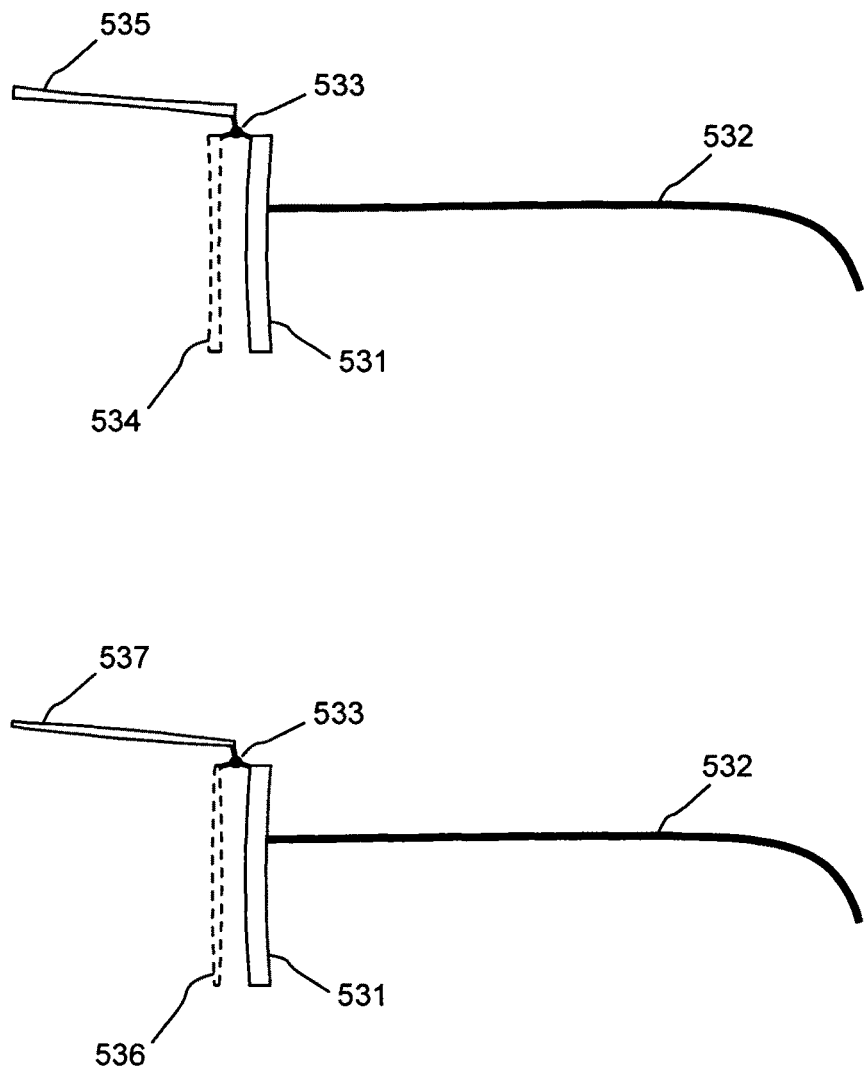
FIG. 53 shows two embodiments of an attachment lens to the magnifying apparatus in eyeglasses.

This lens attachment may be used only occasionally. Therefore, it may be convenient or practical to make the lens attachment removable or switchable among different focal lengths and no lens. Two embodiments of eyeglass frame are shown as side views in FIG. 53. The magnifying apparatus 531 is held by the temple 532. A separate lens is assembled in a frame, which is held by a hinge 533 and attached to the frame of the magnifying apparatus. One embodiment (top) shows a concave lens 535 which may be out of the line of sight or the lens 534 may be turned down into the line of sight when the lens effect is used. The other embodiment (bottom) is with a convex lens which 537 may be out of the line of sight or the lens 536 may be turned down into the line of sight when the lens effect is used.

In the embodiments described above, the lens was an attachment to the magnifying apparatus. In general, people use conventional eyeglasses to adjust the focus of an object, and therefore, these eyeglasses are with lenses. As another embodiment, the magnifying apparatus of the present invention can be considered as an attachment to the conventional eyeglasses. In this embodiment, the lens effect may be is added on the eye side of the magnifying apparatus.

Figure 54:
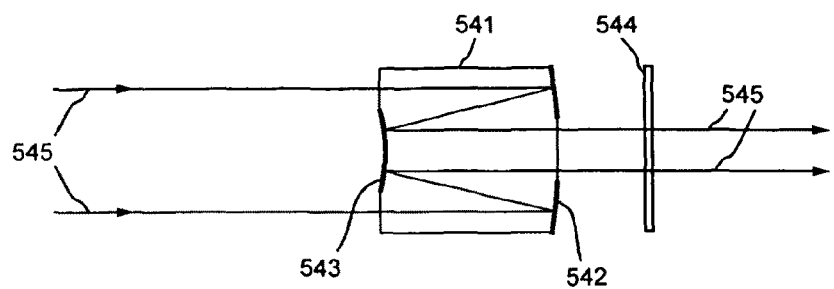
FIG. 54 illustrates one directional layout model of a MMM with a convex lens on the light output side.
Figure 54:
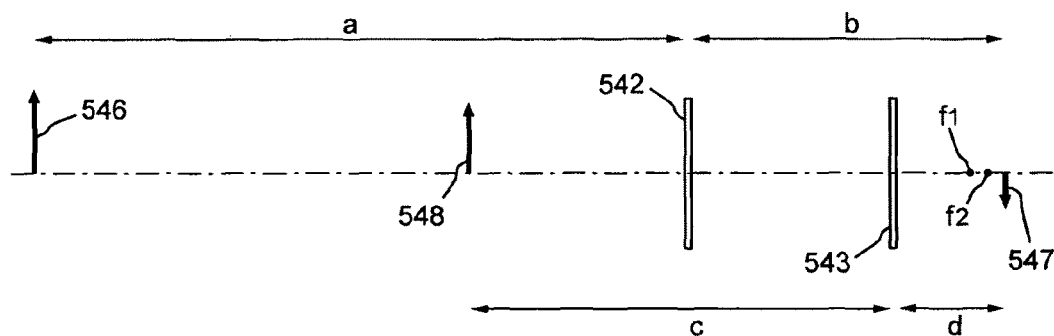
Figure 54:
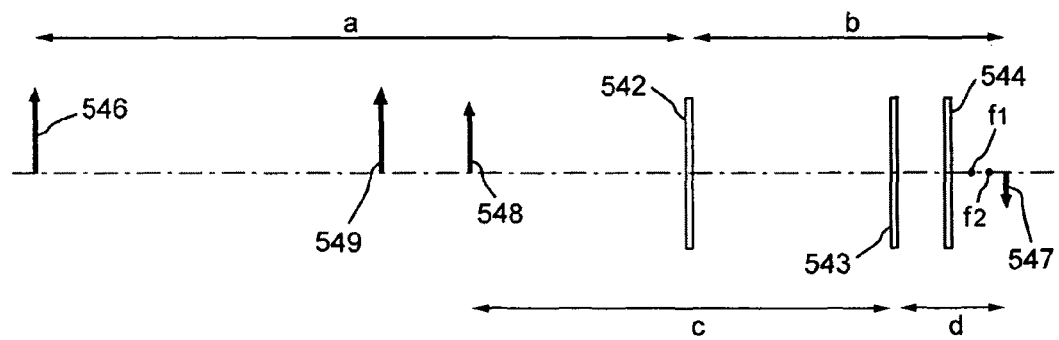

This lens effect on the rays 545 is modeled in FIG. 54 as a lens 544 placed on the opposite side of the MMM 541 to the object. In the MMM, the actual light rays travel back and forth between the concave mirror 542 and the convex mirror 543 as shown in the top of FIG. 54. Here, similarly to FIG. 37 and FIG. 52, all positions along the axis, including the positions of the concave mirror 542, the convex mirror 543, and the lens 544, are laid in one direction.

The figure in the middle is without the lens effect and the figure at +R the bottom is with the effect of a convex lens placed on the eye side of the MMM. In both cases, the MMM creates the invisible image 547 of the object 546 at the same position, and then creates the magnified image 548 at the same distance. In the arrangement shown in the middle of FIG. 54 the magnified image is viewed from the eye without the lens effect. In the arrangement shown at the bottom if FIG. 54, where a convex lens is placed on the eye side of the magnifying apparatus, the magnified image is viewed through the lens from the eye as if it is positioned at the virtual image 549 of the magnified image of the object. If the original eyeglasses are already adjusted to infinity, the MMM should create the magnified image of the object at infinity.

Figure 55:
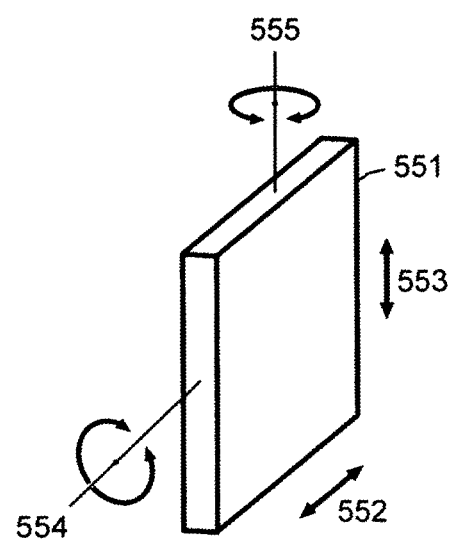
FIG. 55 shows possible adjustments of positions and angles of the magnifying apparatus in eyeglasses.

In order for the magnifying apparatus in eyeglasses described above to work for a wide view angle, the relative position between the magnifying apparatus and the eyeball should be maintained. To maintain the position of ray convergence in FIG. 38 and FIG. 50 at or near the rotation center of eyeball, it is convenient to provide adjustment mechanisms for positions and angles of the magnifying apparatus 551 as shown in FIG. 55. The adjustments include few the horizontal position 552 and/or the vertical position 553 and/or the distance between the left and the right apparatus and/or the rotation around the horizontal axis 554 and/or the rotation around the vertical axis 555 and/or the normal direction to the plane of the magnifying apparatus. With such a mechanism, the rays of both the left and the right magnifying apparatus can be adjusted to pass near the rotation centers of the eyeballs of the left eye and the right eye, respectively.

Figure 56:
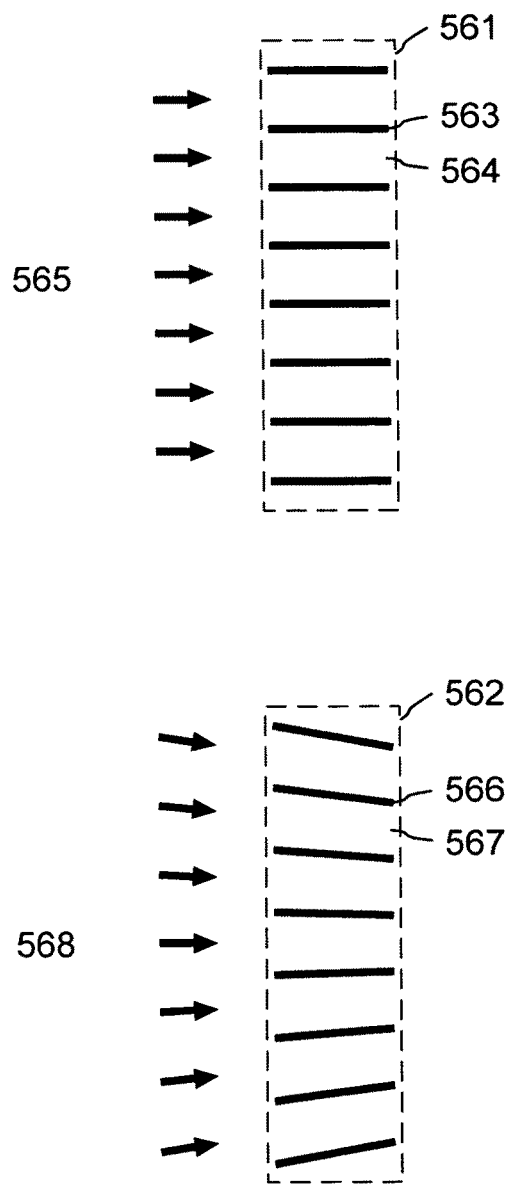
FIG. 56 illustrates cross sections of two embodiments of the louver filters to suppress undesirable light to the eye.

An optical component which blocks light traveling at an angle has been developed using micro louver technology. This component has been commercialized for screens of cell phones, computer monitors, and ATMs. The cross section of the louver filter for optics is shown in FIG. 56. The structure is simple and consists of light absorptive regions (louvers) and transparent regions. The only light allowed to pass through the louver filter is the light traveling in nearly parallel to the louvers. For a macroscopically uniform and isotropic magnifying apparatus, a louver filter such as that shown at 561 in FIG. 56 (top) may be used. Since the louvers 563, which are light absorptive regions, are normal to the plane of louver filter, they allow only light 565, which is normal to the plane of louver filter, to pass through the transparent regions 564. For a magnifying apparatus with a circular symmetry, as shown in FIGS. 38 and 50, the louver filter 562 shown in FIG. 56 (bottom) may be used. Since the louvers are angled, they allow only light 565, which is converging toward the rotation center of the eyeball, to pass through the transparent regions.

Figure 57:
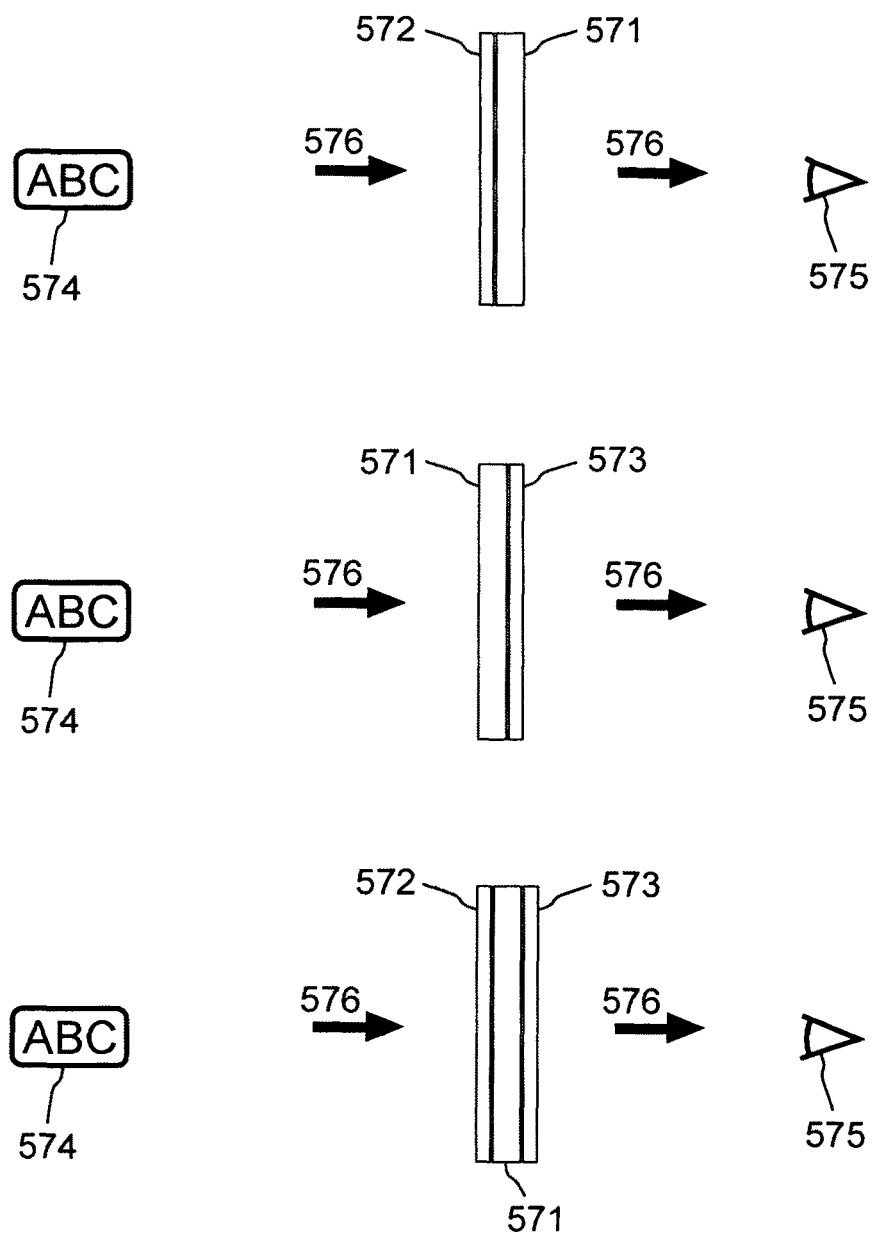
FIG. 57 illustrates three embodiments of the louver filters coupled to the magnifying apparatus.

The louver filter may be used with the magnifying apparatus in a variety of arrangements. Three embodiments are shown in FIG. 57. Whether with non-tilted or tilted MMMs, the object 574 is viewed from the eye 575 through the magnifying apparatus. In the first embodiment (top), the light 576 travels through the first louver filter 572 and the magnifying apparatus 571 in that order. In the second embodiment (middle), the light travels through the magnifying apparatus and the second louver filter 573 in that order. In the third, embodiment (bottom), the light travels through the first louver filter, the magnifying apparatus, and the second louver filter in that order.

Figure 58:
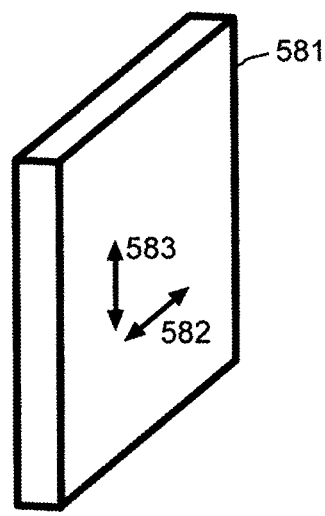
FIG. 58 shows continuous move of the magnifying apparatus to make beam gaps less visible.

When the magnifying apparatus is not close to the eye, the gaps between the light beams emitted from the magnifying apparatus may be large enough to impair the quality of the image. One way to make the beam gaps less visible is to continuously move the magnifying apparatus 581 in both horizontal direction 582 and vertical direction 583, as shown in FIG. 58. The movement should be fast enough to prevent eyes from tracking the positions of the beam gaps. The speed of movement should be preferably greater than 10 times the size of the beam gap per second. It may be moved either manually or mechanically. If the movement is sinusoidal at the same frequency in time, the horizontal movement and the vertical movement should be out of phase.

It is noted that brightness of a magnified image through the magnifying apparatus of the present invention is lower than that of the actual view of the object. This is because the spatial average of light energy remains the same through the apparatus and the light energy entering the eye pupil is unchanged by the apparatus (if no optical loss is assumed), while the image is magnified. Thus, the same amount of optical energy is distributed into the magnified image in the eye.

While the magnifying apparatus of the present invention is intended primarily for viewing distant objects with the unaided eye, a variety of image enhancing devices, image display devices, and image detectors may be advantageously combined with the magnifying apparatus of the invention.

The MMM of the invention may be defined as a general prism. As shown in FIGS. 5 and 11, the prism may be solid or hollow. For the purpose of this description, a general prism is a polyhedron possessing two congruent polygonal faces, and with all remaining faces parallelograms. In one preferred embodiment, the congruent polygonal faces of the prism are rectangular, making the prism a cuboid. In another preferred embodiment, the congruent polygonal faces of the prism are hexagonal. The two congruent polygonal faces of the prism are referred to here for convenience as major faces. The major faces are two opposing faces. One of the major faces, the input major face, is the input side of the MMM and the other major face, the output major face, is the output side of the MMM. In the preferred case, the light being processed is incident on the input major face at an approximately 90 degree angle (normal incidence). Likewise in the preferred case, the light exiting from the MMM exits at an approximately 90 degree angle with respect to the exit major face.

The input major face comprises a convex mirror located in the approximate center of the input major face. A reflective face of the convex mirror faces the interior of the MMM with the focal length of the convex mirror extending from the convex mirror away from the MMM. The convex mirror covers a portion of the input major face (referred to as the covered portion), leaving exposed another portion of the major face surrounding the convex lens (referred to as the uncovered portion). The output major face comprises a concave mirror approximately centered on the output major face. The concave mirror has an opening in the center of the concave mirror, where the center portion of the output major face is exposed. The focal length of the concave mirror extends through the MMM to a point outside the input major face.

The array of MMMs may comprise an array of prisms just described, but is preferably integrated into a plate. For the purpose of defining the invention, an array of MMMs, as defined above, should be construed as including either an array of discrete MMMs suitably mounted on a two dimensional plate, or a single plate having multiple MMMs formed in or on the plate. The MMMs may be described as having the form of general prisms, cuboids or cubes, which shapes will be evident in a form of the array wherein the MMMs are discrete, but the side boundaries of the geometric solids vanish in the integrated form.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the following claims.

The invention claimed is:

1. An optical apparatus comprising a two dimensional array of micro magnifying modules (MMMs), each MMM comprising a transparent body, the transparent body comprising:
   a. a light input side of the transparent body comprising a convex mirror facing the transparent body with the focal point of the convex mirror extending away from the transparent body; the convex mirror covering a covered portion of the light input side of the transparent body leaving an exposed portion of the transparent body,
   b. a light output side of the transparent body on an opposing side of the transparent body; the light output side comprising a concave mirror facing the transparent body with the focal point of the concave mirror extending through the transparent body; the concave mirror having an opening in the center of the concave mirror,
   in which optical apparatus, the concave mirrors and the convex mirrors are positioned so that the magnified images of an object created by different MMMs are equal in horizontal position, vertical position, and size.

2. The optical apparatus of claim 1 where the shortest distance between the opening areas of any pair of neighboring MMMs is smaller than 15 mm.

3. The optical apparatus of claim 1 wherein the MMM has an area along the circumference of the convex mirror, which area is black in color or light absorptive, facing inside of the MMM.

4. The optical apparatus of claim 1 wherein the MMM has an area in the center of the convex mirror, which area is black in color or light absorptive, facing inside of the MMM.

5. The optical apparatus of claim 1 wherein the surface of the area of the concave mirror facing outside of the MMM is black in color or light absorptive.

6. The optical apparatus of claim 1 further including a two dimensional array of micro beam multipliers (MBMs), wherein each MBM comprises at least one beam splitter for converting an input light path into two or more output light paths with the same traveling angle and located at positions moved in directions transversal with each other, with each MBM located adjacent to a MMM.

7. The optical apparatus of claim 6 wherein each MBM contains one or more mirrors each with partial or total reflection.

8. The optical apparatus of claim 1 further including a two dimensional array of ray angle adjusters (RAAs), wherein each RAA comprises at least one pair of mirrors or one or a plurality of transparent wedges for adjusting the angle of light path, with each RAA located adjacent to a MMM.

9. The optical apparatus of claim 8 wherein each RAA contains one or more transparent wedges, wherein the direction normal to the wedge surface is tilted with respect to the center axis of the optical apparatus.

10. The optical apparatus of claim 8 wherein an RAA is placed on at least one side of the MMM; where the light path from an object to the eye which passes through the MMM along the axis of the MMM is converted by the RAA into a light path, the extension of which light path passes a point or within 1 cm of the point, where the distance from the point to the optical apparatus is smaller than 50 cm.

11. The optical apparatus of claim 8 wherein the angle of light path with respect to the center axis of the optical apparatus after passing through the optical apparatus is larger than the angle of light path with respect to the center axis of the optical apparatus before passing through the optical apparatus by a factor which is the magnification of or within plus/minus 20% of the magnification of the MMM.

12. The optical apparatus of claim 8 wherein the chromatic dispersion of angle of light path produced by the RAA which is placed on the light output side of the MMM cancels the accumulated chromatic dispersion of angle of light path produced by all other components including the MMM which are located along the light path.

13. The optical apparatus of claim 8 further including an adjustment mechanism providing for adjustment of one or more of the following;
   a, horizontal position in the plane of the optical apparatus;
   b. vertical position in the plane of the optical apparatus,
   c. angle around the axis in horizontal direction in the plane of the optical apparatus,
   d. angle around the axis in vertical direction in the plane of the optical apparatus.

14. The optical apparatus of claim 8 where two optical apparatus are attached together with the optical axes through the two apparatus parallel to one another.

15. The optical apparatus of claim 1 wherein the convex mirror has a smaller radius and a shorter focal length than the concave mirror.

16. The optical apparatus of claim 1 wherein the concave minor and the convex mirror have approximately the same focal point.

17. The optical apparatus of claim 1 wherein the shapes of the concave mirror and the convex mirror are parabolas.

18. The optical apparatus of claim 1 wherein the concave mirror and the convex mirror share a common center axis.

19. The optical apparatus of claim 1 further comprising one or more louver filters placed on at least one side of the two dimensional array of the MMMs.

20. The optical apparatus of claim 1 further including a mechanism to continuously move the optical apparatus in both horizontal and vertical directions at a distance per second greater than 3 times the width of the MMM.

* * * * *